US008230328B2

(12) United States Patent
Yamamura et al.

(10) Patent No.: US 8,230,328 B2
(45) Date of Patent: Jul. 24, 2012

(54) METHODS AND SYSTEMS FOR DISTRIBUTING LOCALIZED DISPLAY ELEMENTS TO AN IMAGING DEVICE

(75) Inventors: Shinichi Yamamura, Irvine, CA (US); Joey P. Lum, Irvine, CA (US); Mark Liu Stevens, Laguna Hills, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 613 days.

(21) Appl. No.: 11/232,552

(22) Filed: Sep. 22, 2005

(65) Prior Publication Data
US 2006/0077439 A1 Apr. 13, 2006

Related U.S. Application Data

(63) Continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004.

(60) Provisional application No. 60/704,066, filed on Jul. 28, 2005.

(51) Int. Cl.
*G06F 00/17* (2006.01)
(52) U.S. Cl. ........ 715/234; 715/264; 715/200; 715/239; 351/1.13; 351/1.15
(58) Field of Classification Search .................. 715/200, 715/255–256, 264–265, 234, 239
See application file for complete search history.

(56) References Cited

U.S. PATENT DOCUMENTS

| 5,085,587 A | 2/1992 | DesForges et al. |
| 5,323,393 A | 6/1994 | Barrett et al. |
| 5,504,589 A | 4/1996 | Montague et al. |
| 5,513,112 A | 4/1996 | Herring et al. |

(Continued)

FOREIGN PATENT DOCUMENTS
JP        09293036        11/1997
(Continued)

OTHER PUBLICATIONS

Canon USA, Inc.; MEAP Multifunctional Embedded Application Platform; Aug. 2004; http://developersupport.canon.com/Web_MEAP_Presentation.pdf.

(Continued)

*Primary Examiner* — Doug Hutton, Jr.
*Assistant Examiner* — Benjamin Smith
(74) *Attorney, Agent, or Firm* — Krieger Intellectual Property, Inc.; Scott C. Krieger

(57) ABSTRACT

Aspects of the present invention relate to systems, methods and devices for imaging device display content localization. Some aspects relate to methods and systems for sending geographical-locale-related information from an imaging device to a remote computing device where the geographical-locale-related information is matched with related data comprising a language and at least one of a time format, a date format, an address format, a calendar format, a currency type and a geographical-locale-related cultural custom, which is then sent to the imaging device for output to a user.

17 Claims, 15 Drawing Sheets

U.S. PATENT DOCUMENTS

| | | |
|---|---|---|
| 5,542,031 A | 7/1996 | Douglass et al. |
| 5,586,260 A | 12/1996 | Hu |
| 5,659,845 A | 8/1997 | Krist et al. |
| 5,664,206 A * | 9/1997 | Murow et al. ............... 704/8 |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,883 A | 4/1998 | Krist et al. |
| 5,760,775 A | 6/1998 | Sklut et al. |
| 5,774,678 A | 6/1998 | Motoyama |
| 5,778,356 A * | 7/1998 | Heiny ................... 1/1 |
| 5,791,790 A | 8/1998 | Bender et al. |
| 5,796,934 A | 8/1998 | Bhanot et al. |
| 5,799,206 A | 8/1998 | Kitagawa et al. |
| 5,799,289 A | 8/1998 | Fukushima et al. |
| 5,812,818 A | 9/1998 | Adler et al. |
| 5,832,264 A | 11/1998 | Hart et al. |
| 5,848,231 A | 12/1998 | Teitelbaum et al. |
| 5,877,776 A | 3/1999 | Beaman et al. |
| 5,915,001 A * | 6/1999 | Uppaluru ............... 379/88.22 |
| 5,944,824 A | 8/1999 | He |
| 5,956,487 A | 9/1999 | Venkatraman et al. |
| 5,956,698 A | 9/1999 | Lacheze et al. |
| 5,968,127 A | 10/1999 | Kawabe et al. |
| 5,993,088 A | 11/1999 | Nogay et al. |
| 5,995,553 A | 11/1999 | Crandall et al. |
| 5,999,708 A | 12/1999 | Kajita |
| 6,042,384 A | 3/2000 | Loiacono |
| 6,069,706 A | 5/2000 | Kajita |
| 6,075,860 A | 6/2000 | Ketcham |
| 6,115,132 A | 9/2000 | Nakasuma et al. |
| 6,118,546 A | 9/2000 | Sanchez |
| 6,128,731 A | 10/2000 | Zarrin et al. |
| 6,141,662 A | 10/2000 | Jeyachandran |
| 6,148,346 A | 11/2000 | Hanson |
| 6,161,139 A * | 12/2000 | Win et al. ............... 709/225 |
| 6,178,308 B1 | 1/2001 | Bobrow et al. |
| 6,199,080 B1 | 3/2001 | Nielsen |
| 6,213,652 B1 | 4/2001 | Suzuki et al. |
| 6,216,113 B1 * | 4/2001 | Aikens et al. ............... 705/34 |
| 6,233,409 B1 | 5/2001 | Haines et al. |
| 6,240,456 B1 | 5/2001 | Teng et al. |
| 6,246,487 B1 | 6/2001 | Kobayashi et al. |
| 6,292,267 B1 | 9/2001 | Mori et al. |
| 6,301,016 B1 | 10/2001 | Matsueda et al. |
| 6,307,640 B1 | 10/2001 | Motegi |
| 6,311,040 B1 | 10/2001 | Kucinski et al. |
| 6,349,275 B1 * | 2/2002 | Schumacher et al. ............ 704/8 |
| 6,369,905 B1 | 4/2002 | Mitsuhashi et al. |
| 6,407,820 B1 | 6/2002 | Hansen et al. |
| 6,426,798 B1 | 7/2002 | Yeung |
| 6,433,883 B1 | 8/2002 | Kajita |
| 6,438,589 B1 | 8/2002 | Iwata |
| 6,462,756 B1 | 10/2002 | Hansen et al. |
| 6,476,926 B1 | 11/2002 | Yano et al. |
| 6,490,547 B1 * | 12/2002 | Atkin et al. ............... 704/8 |
| 6,490,601 B1 | 12/2002 | Markus et al. |
| 6,509,974 B1 | 1/2003 | Hansen |
| 6,510,466 B1 | 1/2003 | Cox et al. |
| 6,516,157 B1 | 2/2003 | Maruta et al. |
| 6,526,258 B2 | 2/2003 | Bejar et al. |
| 6,567,179 B1 | 5/2003 | Sato et al. |
| 6,587,651 B2 * | 7/2003 | Sadowara et al. ............... 399/27 |
| 6,590,589 B1 | 7/2003 | Sluiman |
| 6,590,673 B2 | 7/2003 | Kadowaki |
| 6,597,469 B1 | 7/2003 | Kuroyanagi |
| 6,604,157 B1 | 8/2003 | Brusky et al. |
| 6,621,422 B2 | 9/2003 | Rubenstein |
| 6,623,529 B1 * | 9/2003 | Lakritz ............... 715/205 |
| 6,636,929 B1 | 10/2003 | Frantz et al. |
| 6,643,650 B1 | 11/2003 | Slaughter et al. |
| 6,652,169 B2 | 11/2003 | Parry |
| 6,685,637 B1 * | 2/2004 | Rom ............... 600/437 |
| 6,721,286 B1 | 4/2004 | Williams et al. |
| 6,735,773 B1 | 5/2004 | Trinh et al. |
| 6,749,434 B2 | 6/2004 | Stuppy |
| 6,772,945 B2 | 8/2004 | Mahoney et al. |
| 6,823,225 B1 | 11/2004 | Sass |
| 6,825,941 B1 * | 11/2004 | Nguyen et al. ............... 358/1.15 |
| 6,826,727 B1 | 11/2004 | Mohr et al. |
| 6,836,623 B2 | 12/2004 | Imai |
| 6,836,845 B1 | 12/2004 | Lennie et al. |
| 6,850,252 B1 | 2/2005 | Hoffberg |
| 6,854,839 B2 | 2/2005 | Collier et al. |
| 6,862,110 B2 | 3/2005 | Harrington |
| 6,862,583 B1 | 3/2005 | Mazzagatte et al. |
| 6,865,716 B1 * | 3/2005 | Thurston ............... 715/207 |
| 6,873,429 B2 | 3/2005 | Matsuura |
| 6,874,010 B1 | 3/2005 | Sargent |
| 6,904,412 B1 | 6/2005 | Broadbent et al. |
| 6,915,525 B2 | 7/2005 | Ozawa |
| 6,934,706 B1 | 8/2005 | Mancuso et al. |
| 6,934,740 B1 | 8/2005 | Lawande et al. |
| 6,940,532 B1 | 9/2005 | Fukui et al. |
| 6,948,175 B1 | 9/2005 | Fong et al. |
| 6,951,303 B2 | 10/2005 | Petersen et al. |
| 6,964,014 B1 * | 11/2005 | Parish ............... 715/205 |
| 6,975,820 B2 | 12/2005 | Wong |
| 6,999,987 B1 * | 2/2006 | Billingsley et al. ............ 709/203 |
| 7,003,723 B1 | 2/2006 | Kremer et al. |
| 7,007,026 B2 * | 2/2006 | Wilkinson et al. ............... 1/1 |
| 7,012,706 B1 | 3/2006 | Hansen |
| 7,013,289 B2 * | 3/2006 | Horn et al. ............... 705/14.51 |
| 7,034,958 B1 | 4/2006 | Hara |
| 7,072,057 B1 | 7/2006 | Hansen |
| 7,079,143 B2 | 7/2006 | Gilbert |
| 7,095,513 B2 | 8/2006 | Stringham |
| 7,107,285 B2 * | 9/2006 | von Kaenel et al. ............... 1/1 |
| 7,107,615 B2 | 9/2006 | Cossel et al. |
| 7,117,504 B2 * | 10/2006 | Smith et al. ............... 719/328 |
| 7,124,097 B2 | 10/2006 | Claremont et al. |
| 7,127,700 B2 | 10/2006 | Large |
| 7,136,909 B2 | 11/2006 | Balasuriya |
| 7,136,941 B2 | 11/2006 | Nguyen et al. |
| 7,143,364 B1 | 11/2006 | Tam |
| 7,145,673 B1 | 12/2006 | Lin |
| 7,145,686 B2 * | 12/2006 | Simpson et al. ............ 358/1.18 |
| 7,149,697 B2 | 12/2006 | Zerza et al. |
| 7,149,964 B1 * | 12/2006 | Cottrille et al. ............... 715/234 |
| 7,162,103 B2 | 1/2007 | Meunier et al. |
| 7,170,618 B2 | 1/2007 | Fujitani et al. |
| 7,174,056 B2 | 2/2007 | Silverbrook et al. |
| 7,177,814 B2 | 2/2007 | Gong et al. |
| 7,181,017 B1 | 2/2007 | Nagel et al. |
| 7,181,442 B2 | 2/2007 | Yeh et al. |
| 7,185,078 B2 | 2/2007 | Pleyer et al. |
| 7,188,125 B1 | 3/2007 | Karr |
| 7,188,181 B1 | 3/2007 | Squier et al. |
| 7,191,393 B1 * | 3/2007 | Chin et al. ............... 715/205 |
| 7,197,615 B2 | 3/2007 | Arakawa et al. |
| 7,203,699 B2 | 4/2007 | Bellamy |
| 7,212,301 B2 | 5/2007 | Treibach-Heck et al. |
| 7,216,347 B1 | 5/2007 | Harrison et al. |
| 7,228,501 B2 * | 6/2007 | Brown et al. ............... 715/234 |
| 7,233,929 B1 * | 6/2007 | Lingle et al. ............... 705/402 |
| 7,234,110 B2 * | 6/2007 | Sumitomo ............... 715/234 |
| 7,239,409 B2 | 7/2007 | Parry |
| 7,249,100 B2 | 7/2007 | Murto et al. |
| RE39,808 E | 9/2007 | Motegi |
| 7,268,896 B2 * | 9/2007 | Bellagamba et al. ............ 358/1.12 |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,284,199 B2 * | 10/2007 | Parasnis et al. ............... 715/201 |
| 7,293,034 B2 | 11/2007 | Paya et al. |
| 7,296,221 B1 | 11/2007 | Treibach-Heck et al. |
| 7,301,658 B2 | 11/2007 | Henry |
| 7,305,616 B1 | 12/2007 | Nelson et al. |
| 7,313,587 B1 * | 12/2007 | Dharmarajan ............... 709/201 |
| 7,321,440 B2 | 1/2008 | Kimura |
| 7,325,196 B1 | 1/2008 | Covington et al. |
| 7,327,478 B2 | 2/2008 | Matsuda |
| 7,328,245 B1 | 2/2008 | Hull et al. |

| Patent/Publication | Kind | Date | Name | Class |
|---|---|---|---|---|
| 7,340,389 | B2* | 3/2008 | Vargas | 704/8 |
| 7,349,949 | B1 | 3/2008 | Connor et al. | |
| 7,363,586 | B1* | 4/2008 | Briggs et al. | 715/736 |
| 7,397,362 | B2* | 7/2008 | Zhang et al. | 340/506 |
| 7,404,204 | B2 | 7/2008 | Davenport et al. | |
| 7,406,660 | B1 | 7/2008 | Sikchi et al. | |
| 7,412,374 | B1* | 8/2008 | Seiler et al. | 704/8 |
| 7,424,129 | B2* | 9/2008 | Hull et al. | 382/100 |
| 7,437,406 | B2* | 10/2008 | Hauduc et al. | 709/203 |
| 7,437,663 | B2* | 10/2008 | Lakhdhir et al. | 715/234 |
| 7,441,188 | B1 | 10/2008 | Russell et al. | |
| 7,444,519 | B2 | 10/2008 | Laferriere et al. | |
| 7,444,590 | B2* | 10/2008 | Christian et al. | 715/264 |
| 7,451,117 | B2 | 11/2008 | Cozianu et al. | |
| 7,451,392 | B1 | 11/2008 | Chalecki et al. | |
| 7,454,623 | B2 | 11/2008 | Hardt | |
| 7,478,171 | B2* | 1/2009 | Ramaswamy et al. | 709/246 |
| 7,490,167 | B2* | 2/2009 | Pena et al. | 709/246 |
| 7,496,837 | B1 | 2/2009 | Larcheveque et al. | |
| 7,500,178 | B1 | 3/2009 | O'Donnell | |
| 7,508,535 | B2 | 3/2009 | Hart et al. | |
| 7,509,649 | B2* | 3/2009 | Shenfield | 719/310 |
| 7,545,528 | B2 | 6/2009 | Takabayashi et al. | |
| 7,548,334 | B2 | 6/2009 | Lo et al. | |
| 7,552,265 | B2 | 6/2009 | Newman et al. | |
| 7,565,554 | B2 | 7/2009 | Joosten et al. | |
| 7,567,360 | B2 | 7/2009 | Takahashi et al. | |
| 7,657,557 | B2 | 2/2010 | Super | |
| 7,729,363 | B2* | 6/2010 | Shenfield et al. | 370/401 |
| 7,826,081 | B2* | 11/2010 | Stevens et al. | 358/1.15 |
| 8,049,677 | B2* | 11/2011 | Lum et al. | 345/1.1 |
| 2001/0021945 | A1 | 9/2001 | Matsuura | |
| 2001/0027527 | A1 | 10/2001 | Khidekel et al. | |
| 2001/0028808 | A1 | 10/2001 | Nomura et al. | |
| 2001/0038462 | A1 | 11/2001 | Teeuwen et al. | |
| 2001/0039614 | A1 | 11/2001 | Hellberg et al. | |
| 2001/0044787 | A1 | 11/2001 | Shwartz et al. | |
| 2002/0016921 | A1 | 2/2002 | Olsen et al. | |
| 2002/0020750 | A1* | 2/2002 | Dymetman et al. | 235/472.01 |
| 2002/0029256 | A1 | 3/2002 | Zintel et al. | |
| 2002/0032745 | A1 | 3/2002 | Honda | |
| 2002/0049786 | A1 | 4/2002 | Bibliowicz et al. | |
| 2002/0052916 | A1 | 5/2002 | Kloba et al. | |
| 2002/0055984 | A1 | 5/2002 | Chang et al. | |
| 2002/0059265 | A1 | 5/2002 | Valorose, III | |
| 2002/0073148 | A1 | 6/2002 | Haines et al. | |
| 2002/0080381 | A1 | 6/2002 | Haines | |
| 2002/0089691 | A1 | 7/2002 | Fertlitsch et al. | |
| 2002/0093676 | A1 | 7/2002 | Parry | |
| 2002/0099796 | A1 | 7/2002 | Chou | |
| 2002/0103827 | A1 | 8/2002 | Sesek | |
| 2002/0105664 | A1 | 8/2002 | Inoue et al. | |
| 2002/0107939 | A1 | 8/2002 | Ford et al. | |
| 2002/0109718 | A1 | 8/2002 | Mansour et al. | |
| 2002/0112037 | A1 | 8/2002 | Koss | |
| 2002/0120792 | A1 | 8/2002 | Blair | |
| 2002/0138279 | A1 | 9/2002 | Al-Kazily et al. | |
| 2002/0138476 | A1 | 9/2002 | Suwa et al. | |
| 2002/0138666 | A1 | 9/2002 | Fujisawa | |
| 2002/0145627 | A1 | 10/2002 | Whitmarsh | |
| 2002/0147858 | A1 | 10/2002 | Motoyama et al. | |
| 2002/0152183 | A1 | 10/2002 | Soares et al. | |
| 2002/0152235 | A1 | 10/2002 | Motoyama et al. | |
| 2002/0152302 | A1 | 10/2002 | Motoyama et al. | |
| 2002/0156688 | A1* | 10/2002 | Horn et al. | 705/26 |
| 2002/0156795 | A1 | 10/2002 | Edwards et al. | |
| 2002/0171857 | A1 | 11/2002 | Hisatomi | |
| 2002/0194180 | A1 | 12/2002 | Alsop et al. | |
| 2003/0002074 | A1 | 1/2003 | Miyano | |
| 2003/0007170 | A1 | 1/2003 | Kajita et al. | |
| 2003/0011633 | A1 | 1/2003 | Conley | |
| 2003/0011640 | A1* | 1/2003 | Green et al. | 345/810 |
| 2003/0014515 | A1 | 1/2003 | Motoyama et al. | |
| 2003/0014529 | A1 | 1/2003 | Simpson et al. | |
| 2003/0033369 | A1 | 2/2003 | Bernhard | |
| 2003/0035133 | A1 | 2/2003 | Berkema et al. | |
| 2003/0038965 | A1 | 2/2003 | Simpson et al. | |
| 2003/0043205 | A1 | 3/2003 | Hill | |
| 2003/0043396 | A1 | 3/2003 | Klosterman et al. | |
| 2003/0043405 | A1 | 3/2003 | Hill | |
| 2003/0048470 | A1 | 3/2003 | Garcia | |
| 2003/0048473 | A1 | 3/2003 | Rosen | |
| 2003/0049037 | A1* | 3/2003 | Sadowara et al. | 399/27 |
| 2003/0053123 | A1 | 3/2003 | Wu et al. | |
| 2003/0063313 | A1 | 4/2003 | Ito | |
| 2003/0065766 | A1 | 4/2003 | Parry | |
| 2003/0065791 | A1 | 4/2003 | Garg et al. | |
| 2003/0065985 | A1* | 4/2003 | McGeorge, Jr. | 714/46 |
| 2003/0074267 | A1 | 4/2003 | Acharya et al. | |
| 2003/0081240 | A1 | 5/2003 | Soto et al. | |
| 2003/0084114 | A1* | 5/2003 | Simpson et al. | 709/216 |
| 2003/0088642 | A1 | 5/2003 | Price et al. | |
| 2003/0123112 | A1 | 7/2003 | Kajita et al. | |
| 2003/0131110 | A1* | 7/2003 | Chang et al. | 709/227 |
| 2003/0142351 | A1 | 7/2003 | Sakura | |
| 2003/0164987 | A1 | 9/2003 | Enomoto et al. | |
| 2003/0167336 | A1 | 9/2003 | Iwamoto et al. | |
| 2003/0174356 | A1 | 9/2003 | Cherry et al. | |
| 2003/0182632 | A1* | 9/2003 | Murdock et al. | 715/536 |
| 2003/0184552 | A1 | 10/2003 | Chadha | |
| 2003/0184590 | A1 | 10/2003 | Will | |
| 2003/0184782 | A1 | 10/2003 | Perkins | |
| 2003/0188193 | A1 | 10/2003 | Venkataramappa | |
| 2003/0197883 | A1 | 10/2003 | Lay et al. | |
| 2003/0212982 | A1* | 11/2003 | Brooks et al. | 717/100 |
| 2003/0225796 | A1 | 12/2003 | Matsubara | |
| 2003/0225829 | A1* | 12/2003 | Pena et al. | 709/203 |
| 2003/0225894 | A1 | 12/2003 | Ito | |
| 2003/0231196 | A1 | 12/2003 | Keohane et al. | |
| 2003/0233437 | A1 | 12/2003 | Kitada et al. | |
| 2004/0003341 | A1 | 1/2004 | alSafadi et al. | |
| 2004/0008363 | A1 | 1/2004 | Suzuki et al. | |
| 2004/0012628 | A1 | 1/2004 | Kropf et al. | |
| 2004/0012644 | A1 | 1/2004 | Allen et al. | |
| 2004/0019705 | A1* | 1/2004 | Ogura | 709/253 |
| 2004/0034807 | A1 | 2/2004 | Rostowfske | |
| 2004/0039990 | A1 | 2/2004 | Bakar et al. | |
| 2004/0044779 | A1 | 3/2004 | Lambert | |
| 2004/0046789 | A1* | 3/2004 | Inanoria | 345/748 |
| 2004/0054573 | A1* | 3/2004 | Shah et al. | 705/14 |
| 2004/0061729 | A1 | 4/2004 | Green | |
| 2004/0064759 | A1 | 4/2004 | McGuire et al. | |
| 2004/0070606 | A1 | 4/2004 | Yang et al. | |
| 2004/0080511 | A1 | 4/2004 | Gilbert | |
| 2004/0080771 | A1 | 4/2004 | Mihira et al. | |
| 2004/0080778 | A1 | 4/2004 | Ito et al. | |
| 2004/0088155 | A1* | 5/2004 | Kerr et al. | 704/8 |
| 2004/0098165 | A1 | 5/2004 | Butikofer | |
| 2004/0098316 | A1 | 5/2004 | Philippe et al. | |
| 2004/0098595 | A1 | 5/2004 | Aupperle et al. | |
| 2004/0105104 | A1* | 6/2004 | Ishikawa et al. | 358/1.6 |
| 2004/0105122 | A1 | 6/2004 | Schaeffer | |
| 2004/0109028 | A1 | 6/2004 | Stern et al. | |
| 2004/0111670 | A1 | 6/2004 | Sasakuma et al. | |
| 2004/0113941 | A1 | 6/2004 | Sliwa et al. | |
| 2004/0117358 | A1* | 6/2004 | von Kaenel et al. | 707/3 |
| 2004/0117784 | A1 | 6/2004 | Endoh | |
| 2004/0122659 | A1* | 6/2004 | Hourihane et al. | 704/9 |
| 2004/0125403 | A1 | 7/2004 | Furst et al. | |
| 2004/0130744 | A1 | 7/2004 | Wu et al. | |
| 2004/0130749 | A1 | 7/2004 | Aoki | |
| 2004/0133525 | A1 | 7/2004 | Singh et al. | |
| 2004/0150663 | A1 | 8/2004 | Kim | |
| 2004/0158471 | A1 | 8/2004 | Davis et al. | |
| 2004/0161257 | A1 | 8/2004 | Ishihara | |
| 2004/0162076 | A1 | 8/2004 | Chowdry et al. | |
| 2004/0165209 | A1 | 8/2004 | Aoki et al. | |
| 2004/0169881 | A1 | 9/2004 | Sato | |
| 2004/0179229 | A1 | 9/2004 | Laughlin | |
| 2004/0193678 | A1 | 9/2004 | Trufinescu et al. | |
| 2004/0203358 | A1 | 10/2004 | Anderson et al. | |
| 2004/0205118 | A1* | 10/2004 | Yu | 709/203 |
| 2004/0205533 | A1 | 10/2004 | Lopata et al. | |
| 2004/0212823 | A1 | 10/2004 | Chavers et al. | |
| 2004/0215671 | A1 | 10/2004 | Hyakutake et al. | |
| 2004/0221231 | A1 | 11/2004 | Madril et al. | |
| 2004/0223778 | A1 | 11/2004 | Zwiefelhofer | |
| 2004/0226993 | A1 | 11/2004 | Fulcher et al. | |

| Publication No. | Date | Inventor | Class |
|---|---|---|---|
| 2004/0227968 A1 | 11/2004 | Nakamura et al. | |
| 2004/0230500 A1* | 11/2004 | Imago | 705/27 |
| 2004/0230637 A1* | 11/2004 | Lecoueche et al. | 709/200 |
| 2004/0236862 A1 | 11/2004 | Ito | |
| 2004/0254955 A1 | 12/2004 | Reese et al. | |
| 2004/0255263 A1 | 12/2004 | Ando | |
| 2004/0261010 A1* | 12/2004 | Matsuishi | 715/501.1 |
| 2004/0268229 A1 | 12/2004 | Paoli et al. | |
| 2004/0268306 A1* | 12/2004 | Cheng et al. | 717/114 |
| 2005/0005094 A1 | 1/2005 | Jamieson et al. | |
| 2005/0015472 A1 | 1/2005 | Catania et al. | |
| 2005/0026593 A1 | 2/2005 | Anderson et al. | |
| 2005/0044248 A1 | 2/2005 | Mihira et al. | |
| 2005/0055475 A1 | 3/2005 | MacKay et al. | |
| 2005/0057560 A1 | 3/2005 | Bibr et al. | |
| 2005/0060046 A1 | 3/2005 | Ito et al. | |
| 2005/0060564 A1 | 3/2005 | Murakami et al. | |
| 2005/0063010 A1 | 3/2005 | Giannetti | |
| 2005/0068581 A1 | 3/2005 | Hull et al. | |
| 2005/0071507 A1 | 3/2005 | Ferlitsch | |
| 2005/0071746 A1 | 3/2005 | Hart et al. | |
| 2005/0076291 A1* | 4/2005 | Yee et al. | 715/513 |
| 2005/0080649 A1 | 4/2005 | Alvarez et al. | |
| 2005/0091087 A1 | 4/2005 | Smith et al. | |
| 2005/0091490 A1 | 4/2005 | Ogura | |
| 2005/0091671 A1* | 4/2005 | Deem et al. | 719/328 |
| 2005/0102616 A1* | 5/2005 | Thurston | 715/513 |
| 2005/0108353 A1 | 5/2005 | Yamamoto | |
| 2005/0114267 A1 | 5/2005 | Miwa et al. | |
| 2005/0114658 A1 | 5/2005 | Dye et al. | |
| 2005/0114766 A1 | 5/2005 | Yamamoto | |
| 2005/0119955 A1 | 6/2005 | Dang et al. | |
| 2005/0129423 A1 | 6/2005 | Lester et al. | |
| 2005/0131715 A1* | 6/2005 | Trethewey | 705/1 |
| 2005/0138547 A1* | 6/2005 | Muhanna et al. | 715/513 |
| 2005/0149576 A1 | 7/2005 | Marmaros et al. | |
| 2005/0185217 A1 | 8/2005 | Nishizawa et al. | |
| 2005/0195221 A1 | 9/2005 | Berger et al. | |
| 2005/0203747 A1* | 9/2005 | Lecoeuche | 704/270.1 |
| 2005/0210399 A1 | 9/2005 | Filner et al. | |
| 2005/0223413 A1 | 10/2005 | Duggan et al. | |
| 2005/0231747 A1 | 10/2005 | Bledsoe et al. | |
| 2005/0231755 A1 | 10/2005 | Araumi et al. | |
| 2005/0246428 A1 | 11/2005 | Araumi | |
| 2005/0257134 A1 | 11/2005 | Goodman et al. | |
| 2005/0257148 A1 | 11/2005 | Goodman et al. | |
| 2005/0262440 A1* | 11/2005 | Stanciu et al. | 715/523 |
| 2005/0265744 A1 | 12/2005 | Uruta | |
| 2006/0004738 A1* | 1/2006 | Blackwell et al. | 707/4 |
| 2006/0007480 A1 | 1/2006 | Yokokura | |
| 2006/0010180 A1 | 1/2006 | Kawamura et al. | |
| 2006/0015734 A1 | 1/2006 | Atobe | |
| 2006/0038004 A1 | 2/2006 | Rielly et al. | |
| 2006/0045386 A1 | 3/2006 | Fukuoka et al. | |
| 2006/0056873 A1 | 3/2006 | Kimura | |
| 2006/0059434 A1 | 3/2006 | Boss et al. | |
| 2006/0064647 A1 | 3/2006 | Tapuska et al. | |
| 2006/0077119 A1* | 4/2006 | Zhang et al. | 345/2.1 |
| 2006/0077411 A1* | 4/2006 | Mathieson et al. | 358/1.13 |
| 2006/0077413 A1* | 4/2006 | Lum et al. | 358/1.13 |
| 2006/0077414 A1* | 4/2006 | Lum et al. | 358/1.13 |
| 2006/0077423 A1 | 4/2006 | Mathieson et al. | |
| 2006/0077426 A1* | 4/2006 | Lovat et al. | 358/1.15 |
| 2006/0077427 A1* | 4/2006 | Zhang et al. | 358/1.15 |
| 2006/0077428 A1* | 4/2006 | Lovat et al. | 358/1.15 |
| 2006/0077429 A1* | 4/2006 | Zhang et al. | 358/1.15 |
| 2006/0077430 A1* | 4/2006 | Zhang et al. | 358/1.15 |
| 2006/0077431 A1* | 4/2006 | Zhang et al. | 358/1.15 |
| 2006/0077432 A1* | 4/2006 | Lovat et al. | 358/1.15 |
| 2006/0077433 A1* | 4/2006 | Zhang et al. | 358/1.15 |
| 2006/0077434 A1* | 4/2006 | Zhang et al. | 358/1.15 |
| 2006/0077435 A1* | 4/2006 | Lovat et al. | 358/1.15 |
| 2006/0077436 A1* | 4/2006 | Zhang et al. | 358/1.15 |
| 2006/0077437 A1* | 4/2006 | Lovat et al. | 358/1.15 |
| 2006/0077438 A1* | 4/2006 | Lovat et al. | 358/1.15 |
| 2006/0077439 A1* | 4/2006 | Yamamura et al. | 358/1.15 |
| 2006/0077440 A1* | 4/2006 | Stevens et al. | 358/1.15 |
| 2006/0077442 A1* | 4/2006 | Lum et al. | 358/1.15 |
| 2006/0077443 A1* | 4/2006 | Lum et al. | 358/1.15 |
| 2006/0077444 A1* | 4/2006 | Lum et al. | 358/1.15 |
| 2006/0077445 A1* | 4/2006 | Yamamura et al. | 358/1.15 |
| 2006/0077446 A1* | 4/2006 | Lum et al. | 358/1.15 |
| 2006/0077447 A1* | 4/2006 | Sojian et al. | 358/1.15 |
| 2006/0077448 A1* | 4/2006 | Plewnia et al. | 358/1.15 |
| 2006/0077449 A1* | 4/2006 | Lum et al. | 358/1.15 |
| 2006/0077450 A1* | 4/2006 | Reddy et al. | 358/1.15 |
| 2006/0077451 A1* | 4/2006 | Nguyen et al. | 358/1.15 |
| 2006/0077452 A1* | 4/2006 | Nguyen et al. | 358/1.15 |
| 2006/0077453 A1* | 4/2006 | Plewnia et al. | 358/1.15 |
| 2006/0077454 A1* | 4/2006 | Lum et al. | 358/1.15 |
| 2006/0078345 A1* | 4/2006 | Lovat et al. | 399/79 |
| 2006/0078346 A1* | 4/2006 | Lovat et al. | 399/79 |
| 2006/0080123 A1* | 4/2006 | Plewnia | 705/1 |
| 2006/0080124 A1* | 4/2006 | Plewnia | 705/1 |
| 2006/0080129 A1* | 4/2006 | Reddy et al. | 705/1 |
| 2006/0080184 A1* | 4/2006 | Zhang et al. | 705/26 |
| 2006/0080185 A1* | 4/2006 | Lovat et al. | 705/26 |
| 2006/0080731 A1* | 4/2006 | Zhang et al. | 726/8 |
| 2006/0085430 A1* | 4/2006 | Yamamura et al. | 707/10 |
| 2006/0085835 A1 | 4/2006 | Istvan et al. | |
| 2006/0086788 A1* | 4/2006 | Zhang et al. | 235/382 |
| 2006/0090128 A1* | 4/2006 | Reddy et al. | 715/513 |
| 2006/0092097 A1* | 5/2006 | Reddy et al. | 345/2.1 |
| 2006/0095541 A1* | 5/2006 | Sojian et al. | 709/217 |
| 2006/0095542 A1* | 5/2006 | Reddy et al. | 709/217 |
| 2006/0103588 A1* | 5/2006 | Chrisop et al. | 345/2.1 |
| 2006/0103873 A1* | 5/2006 | Reddy et al. | 358/1.15 |
| 2006/0107212 A1* | 5/2006 | Lovat et al. | 715/700 |
| 2006/0112123 A1* | 5/2006 | Clark et al. | 707/101 |
| 2006/0117257 A1* | 6/2006 | Hasson et al. | 715/535 |
| 2006/0119883 A1* | 6/2006 | Lovat et al. | 358/1.15 |
| 2006/0154227 A1 | 7/2006 | Rossi et al. | |
| 2006/0162076 A1 | 7/2006 | Bartlett et al. | |
| 2006/0165105 A1* | 7/2006 | Shenfield et al. | 370/401 |
| 2006/0168355 A1* | 7/2006 | Shenfield et al. | 709/250 |
| 2006/0174196 A1* | 8/2006 | Zhang et al. | 715/523 |
| 2006/0198653 A1 | 9/2006 | Plewnia et al. | |
| 2006/0200748 A1* | 9/2006 | Shenfield | 715/501.1 |
| 2006/0200749 A1* | 9/2006 | Shenfield | 715/501.1 |
| 2006/0221941 A1* | 10/2006 | Kishinsky et al. | 370/352 |
| 2006/0224405 A1 | 10/2006 | White et al. | |
| 2006/0235742 A1 | 10/2006 | Castellanos et al. | |
| 2006/0277286 A1* | 12/2006 | Zhang et al. | 709/223 |
| 2006/0279474 A1* | 12/2006 | Lum et al. | 345/2.1 |
| 2006/0279475 A1* | 12/2006 | Lum et al. | 345/2.1 |
| 2007/0022180 A1* | 1/2007 | Cocotis et al. | 709/217 |
| 2007/0028214 A1* | 2/2007 | Shu et al. | 717/120 |
| 2007/0041035 A1 | 2/2007 | Sembower et al. | |
| 2007/0061129 A1* | 3/2007 | Barreiro | 704/9 |
| 2007/0078805 A1* | 4/2007 | Reddy et al. | 707/1 |
| 2007/0091010 A1* | 4/2007 | Richardson et al. | 345/2.1 |
| 2007/0094103 A1 | 4/2007 | Hyakutake et al. | |
| 2007/0146823 A1* | 6/2007 | Borchers et al. | 358/496 |
| 2007/0147610 A1* | 6/2007 | Kethi Reddy | 380/229 |
| 2007/0173266 A1* | 7/2007 | Barnes, Jr. | 455/456.1 |
| 2007/0174894 A1 | 7/2007 | Matsunaga | |
| 2007/0201654 A1* | 8/2007 | Shenfield | 379/201.01 |
| 2007/0201655 A1* | 8/2007 | Shenfield | 379/201.01 |
| 2007/0226608 A1* | 9/2007 | Virk et al. | 715/513 |
| 2007/0233902 A1* | 10/2007 | Trefler et al. | 709/246 |
| 2007/0283274 A1* | 12/2007 | Mettifogo | 715/744 |
| 2007/0291293 A1* | 12/2007 | Bellagamba et al. | 358/1.12 |
| 2008/0022267 A1* | 1/2008 | Johnson et al. | 717/143 |
| 2008/0046806 A1* | 2/2008 | Reddy et al. | 715/221 |
| 2008/0072162 A1 | 3/2008 | Dauerer et al. | |
| 2008/0155396 A1* | 6/2008 | Dubinko et al. | 715/251 |
| 2008/0162116 A1* | 7/2008 | Briggs et al. | 704/8 |

FOREIGN PATENT DOCUMENTS

| | | |
|---|---|---|
| JP | 09330190 | 12/1997 |
| JP | 10013695 | 1/1998 |
| JP | 10154190 A | 6/1998 |
| JP | 2000174949 | 6/2000 |
| JP | 2000207108 | 7/2000 |
| JP | 2002259071 | 2/2001 |
| JP | 200284383 | 3/2002 |
| JP | 2002171380 | 6/2002 |
| JP | 2002175195 | 6/2002 |

| | | |
|---|---|---|
| JP | 2002236830 | 8/2002 |
| JP | 2002298049 A | 10/2002 |
| JP | 2002312148 | 10/2002 |
| JP | 2002324049 | 11/2002 |
| JP | 2002351644 | 12/2002 |
| JP | 2003022258 | 1/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003216368 | 7/2003 |
| JP | 2003216395 A | 7/2003 |
| JP | 2003223299 | 8/2003 |
| JP | 2003281227 | 10/2003 |
| JP | 200430448 | 1/2004 |
| JP | 2004088561 | 3/2004 |
| JP | 2004094313 | 3/2004 |
| JP | 2004128561 | 4/2004 |
| JP | 2004118549 | 5/2004 |
| JP | 2004164157 A | 6/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004246771 | 9/2004 |
| JP | 2004276271 | 12/2004 |
| JP | 2004358800 | 12/2004 |
| JP | 2005014591 | 1/2005 |
| JP | 2005070979 | 3/2005 |
| JP | 2005078278 | 3/2005 |
| JP | 2005084891 | 3/2005 |
| JP | 2005004243 | 6/2005 |
| JP | 2005219440 A | 8/2005 |
| JP | 2005235034 A | 9/2005 |
| JP | 2005269250 | 9/2005 |
| JP | 2006053905 | 2/2006 |
| JP | 2006140898 | 6/2006 |
| JP | 10240490 | 9/2998 |
| WO | WO0118754 A1 | 3/2001 |
| WO | WO01/33381 | 5/2001 |
| WO | WO0198864 | 12/2001 |

OTHER PUBLICATIONS

Canon USA, Inc.; MEAP: FAQ; accessed on Jul. 2004, pub. date unknown; http://developersupport.canon.com/MEAP.htm.
Xerox, Inc.; XEROX FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper: Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.
Hewlett-Packard Company; JetCAPS chai applications; Dec. 9, 2002; http://www.stethos.com/chai/data/d_us_chai.pdf.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
F.D. Wright, Design Goals for an Internet Printing Protocol, Apr. 1999, pp. 1-43, http://tools.ietf.org/html/rfc2567.
R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).
T. Hastings, "Internet Printing Protocol/1.1: Model and Semantics" (Sep. 2000, retrieved from http://www.ietf.org/rfc/rfc2911.txt on Sep. 18, 2008, pp. 1-210).
R. Herriot, Internet Printing Protocol (IPP): Event Notifications and Subscriptions, Jun. 21, 2004, http://tools.ietf.org/html/draft-ietf-ipp-not-spec-12, pp. 1-98.
Microsoft Corporation. Microsoft Computer Dictionary, Fifth Edition, 2002 Microsoft Press, pp. 487-488.
Gaedke, Martin et al. "A Modeling Approach to Federated Identity and Access Management", May 2005 ACM.
FOLDOC. "relational database", Jun. 2002, retrieved from <http://foldoc.org/index.cgi?query=relational+database>.
OASIS. "Security Assertion Markup Language (SAML) 2.0 Technical Overview", Working Draft 01, Jul. 22, 2004, <http://www.oasis-open.org/committees/documents.php?wg_abbrev=security>.
Hartman, Bret et al. Mastering Web Services Security, 2003 Wiley Publishing, Inc., pp. 36-46.
U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.

Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.

U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non-Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.
U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006205159—Japanese Office Action filed for a related foreign application dated Sep. 27, 2011 corresponding to U.S. Appl. No. 11/192,500.
U.S. Appl. No. 11/465,722—Non-Final Office Action dated Aug. 5, 2011.
U.S. Appl. No. 11/192,862—Non-Final Office Action dated Oct. 13, 2011.
U.S. Appl. No. 11/192,870—Final Office Action dated Aug. 8, 2011.
U.S. Appl. No. 11/192,500—Non-Final Office Action dated Sep. 30, 2011.
U.S. Appl. No. 11/192,615—Final Office Action dated Oct. 11, 2011.
U.S. Appl. No. 11/465,752—Final Office Action dated Oct. 31, 2011.
U.S. Appl. No. 10/961,594—Notice of Allowance dated Oct. 13, 2011.
U.S. Appl. No. 11/465,699—Notice of Allowance dated Sep. 30, 2011.
U.S. Appl. No. 11/241,011—Notice of Allowance dated Sep. 6, 2011.
U.S. Appl. No. 11/192,617—Notice of Allowance dated Oct. 11, 2011.
U.S. Appl. No. 11/193,076—Notice of Allowance dated Oct. 11, 2011.
U.S. Appl. No. 11/192,546—Notice of Allowance dated Aug. 30, 2011.
U.S. Appl. No. 11/192,616—Notice of Allowance dated Oct. 11, 2011.
U.S. Appl. No. 11/193,151—Notice of Allowance dated Aug. 22, 2011.
U.S. Appl. No. 11/241,320—Notice of Allowance dated Oct. 11, 2011.
U.S. Appl. No. 11/240,139—Notice of Allowance dated Oct. 11, 2011.
U.S. Appl. No. 11/240,084—Notice of Allowance dated Oct. 11, 2011.
U.S. Appl. No. 11/218,033—Notice of Allowance dated Oct. 11, 2011.
U.S. Appl. No. 11/218,186—Notice of Allowance dated Oct. 11, 2011.
Foreign Patent App. No. JP2006261563—Interrogation Report filed for a related foreign application dated Jun. 7, 2011 corresponding to U.S. Appl. No. 11/241,501.
Foreign Patent App. No. JP2006207200—Interrogation Report filed for a related foreign application dated Mar. 8, 2011 corresponding to U.S. Appl. No. 11/192,615.
U.S. Appl. No. 10/961,594—Final Office Action dated May 19, 2011.
U.S. Appl. No. 11/232,827—Non-Final Office Action dated May 26, 2011.
U.S. Appl. No. 11/073,055—Final Office Action dated Mar. 30, 2011.
U.S. Appl. No. 11/233,202—Final Office Action dated Mar. 23, 2011.
U.S. Appl. No. 11/465,699—Non-Final Office Action dated Mar. 23, 2011.
U.S. Appl. No. 11/241,011—Non-Final Office Action dated Feb. 17, 2011.
U.S. Appl. No. 11/192,617—Non-Final Office Action dated Jun. 9, 2011.
U.S. Appl. No. 11/192,546—Non-Final Office Action dated Feb. 17, 2011.
U.S. Appl. No. 11/192,862—Final Office Action dated Mar. 21, 2011.
U.S. Appl. No. 11/192,870—Non-Final Office Action dated Feb. 22, 2011.
U.S. Appl. No. 11/192,616—Non-Final Office Action dated Jun. 9, 2011
U.S. Appl. No. 11/192,500—Final Office Action dated Mar. 21, 2011.
U.S. Appl. No. 11/193,151—Non-Final Office Action dated Mar. 16, 2011.

U.S. Appl. No. 11/192,824—Non-Final Office Action dated Jun. 9, 2011.
U.S. Appl. No. 11/192,547—Final Office Action dated Mar. 7, 2011.
U.S. Appl. No. 11/465,752—Non-Final Office Action dated Apr. 1, 2011.
U.S. Appl. No. 11/241,320—Non-Final Office Action dated Jun. 9, 2011.
U.S. Appl. No. 11/240,139—Non-Final Office Action dated Jun. 10, 2011.
U.S. Appl. No. 11/240,084—Non-Final Office Action dated May 12, 2011.
U.S. Appl. No. 11/536,115—Final Office Action dated Mar. 10, 2011.
U.S. Appl. No. 11/218,033—Non-Final Office Action dated Jun. 9, 2011.
U.S. Appl. No. 11/218,186—Non-Final Office Action dated Jun. 16, 2011.
U.S. Appl. No. 10/962,248—Notice of Allowance dated Apr. 1, 2011.
U.S. Appl. No. 10/961,793—Notice of Allowance dated Jun. 10, 2011.
U.S. Appl. No. 10/962,103—Notice of Allowance dated Feb. 22, 2011.
U.S. Appl. No. 11/233,201—Notice of Allowance dated Jun. 24, 2011.
U.S. Appl. No. 11/241,501—Notice of Allowance dated Feb. 17, 2011.
U.S. Appl. No. 11/241,010—Notice of Allowance dated May 27, 2011.
U.S. Appl. No. 11/241,071—Notice of Allowance dated May 3, 2011.
U.S. Appl. No. 11/241,447—Notice of Allowance dated Jul. 13, 2011.
U.S. Appl. No. 11/241,498—Notice of Allowance dated Apr. 1, 2011.
U.S. Appl. No. 11/240,156—Notice of Allowance dated Jul. 12, 2011.
U.S. Appl. No. 11/256,479—Notice of Allowance dated Jul. 13, 2011.
U.S. Appl. No. 11/192,630—Notice of Allowance dated May 31, 2011.
U.S. Appl. No. 11/192,865—Notice of Allowance dated May 19, 2011.
U.S. Appl. No. 11/192,868—Notice of Allowance dated Apr. 29, 2011.
U.S. Appl. No. 11/193,152—Notice of Allowance dated Apr. 8, 2011.
U.S. Appl. No. 11/192,629—Notice of Allowance dated Apr. 11, 2011.
U.S. Appl. No. 11/192,824—Notice of Allowance dated Apr. 20, 2011.
U.S. Appl. No. 11/256,493—Notice of Allowance dated Apr. 15, 2011.

* cited by examiner

METHODS AND SYSTEMS FOR DISTRIBUTING LOCALIZED DISPLAY ELEMENTS TO AN IMAGING DEVICE

RELATED REFERENCES

This application is a continuation-in-part of U.S. patent application Ser. No. 10/962,248, entitled "Methods and Systems for Imaging Device Remote Application Interaction," filed on Oct. 8, 2004; this application is also a continuation-in-part of U.S. patent application Ser. No. 10/961,793, entitled "Methods and Systems for Imaging Device Remote Form Management," filed on Oct. 8, 2004; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Remote document Management," filed on Oct. 8, 2004; and this application is also a continuation-in-part of U.S. patent application Ser. No. 10/962,103, entitled "Methods and Systems for Imaging Device Document Translation," filed on Oct. 8, 2004; this application also claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for imaging device display element localization.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Embodiments of the present invention comprise methods and systems for imaging device display element localization.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
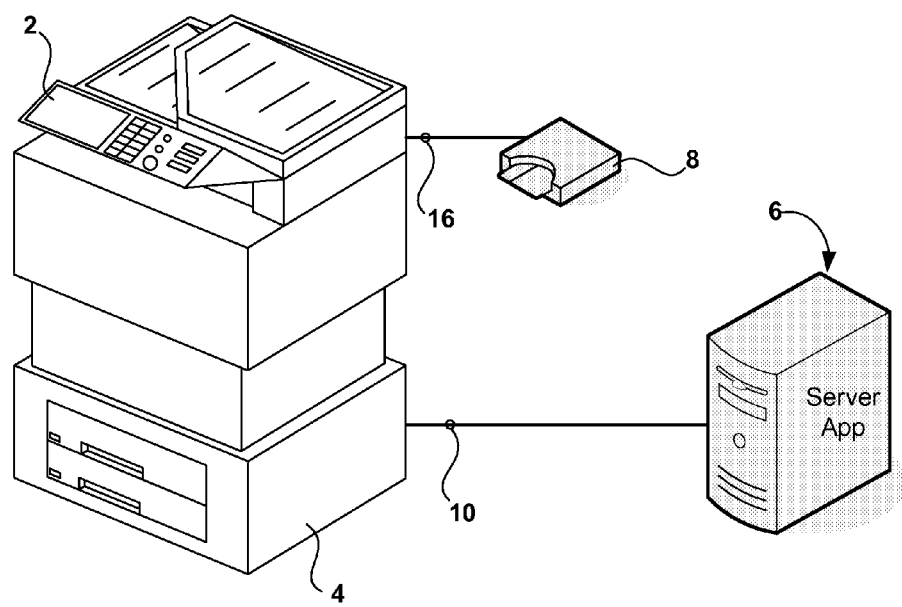
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
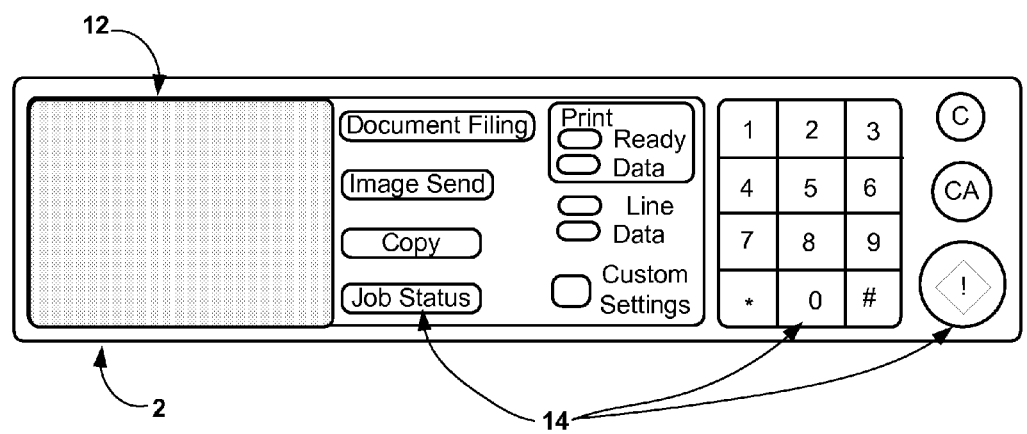
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |

TABLE 2-continued

Exemplary Hardware Key Assignments

| Button Press | Standard IDev Mode | RCD Mode |
|---|---|---|
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job may be authorized, canceled or modified.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
| --- | --- |
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
| --- | --- | --- | --- | --- | --- | --- | --- |
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:
COLOR OR B/W
IMAGE MODE—TEXT, TEXT/PHOTO, PHOTO; EXPOSURE LEVEL
RESOLUTION
FILE FORMAT—FILE TYPE, COMPRESSION, AND PAGES PER FILE
ORIGINAL—ORIGINAL SIZE, SIMPLEX/DUPLEX, ROTATE, AND JOB BUILD
FILENAME
SUBJECT
MESSAGE
SENDER
SCHEDULE SEND TIME
PAGE DIVISION (BOOK SCANNING)
COVER PAGE
TRANSMISSION MESSAGE (CONFIDENTIAL, URGENT, ETC.)
THIN PAPER SCANNING
DESTINATION
DOCUMENT FILING Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:
COLOR OR B/W
EXPOSURE—TEXT, TEXT/PHOTO, PHOTO, SUPER PHOTO; EXPOSURE LEVEL
PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE Security Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
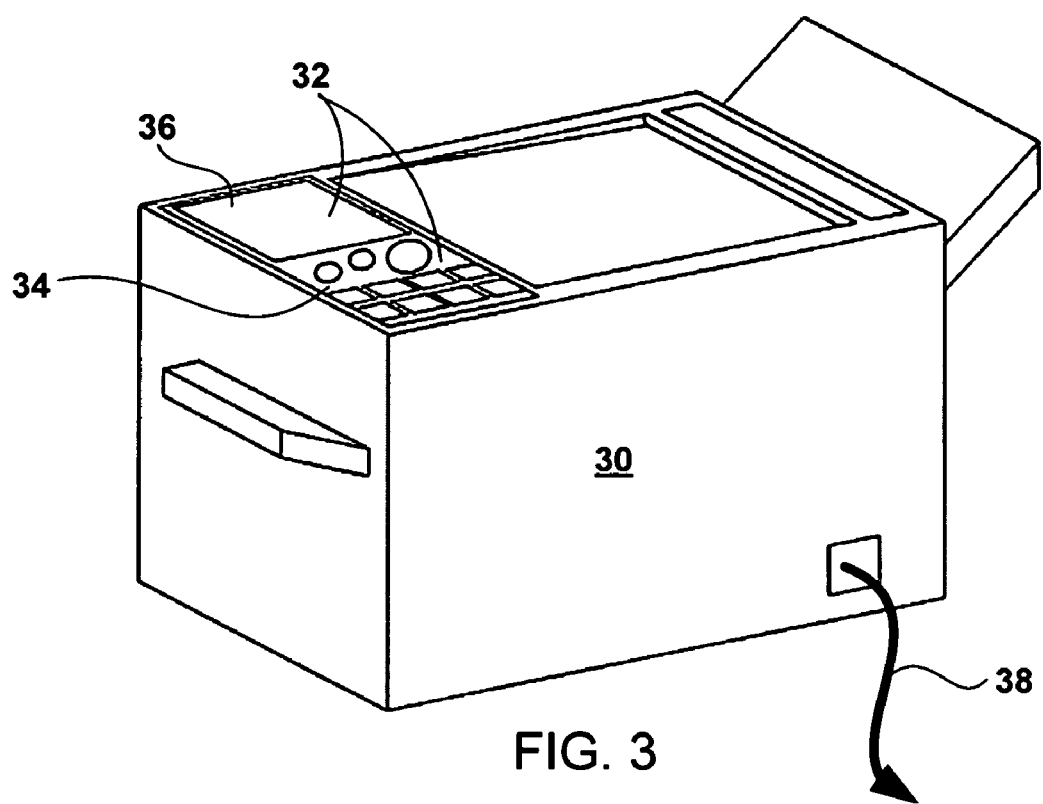
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11(b) compliant connection, a Bluetooth connection, an Infrared Data Association (IrDA) connection or some other wireless connection.

Figure 4:
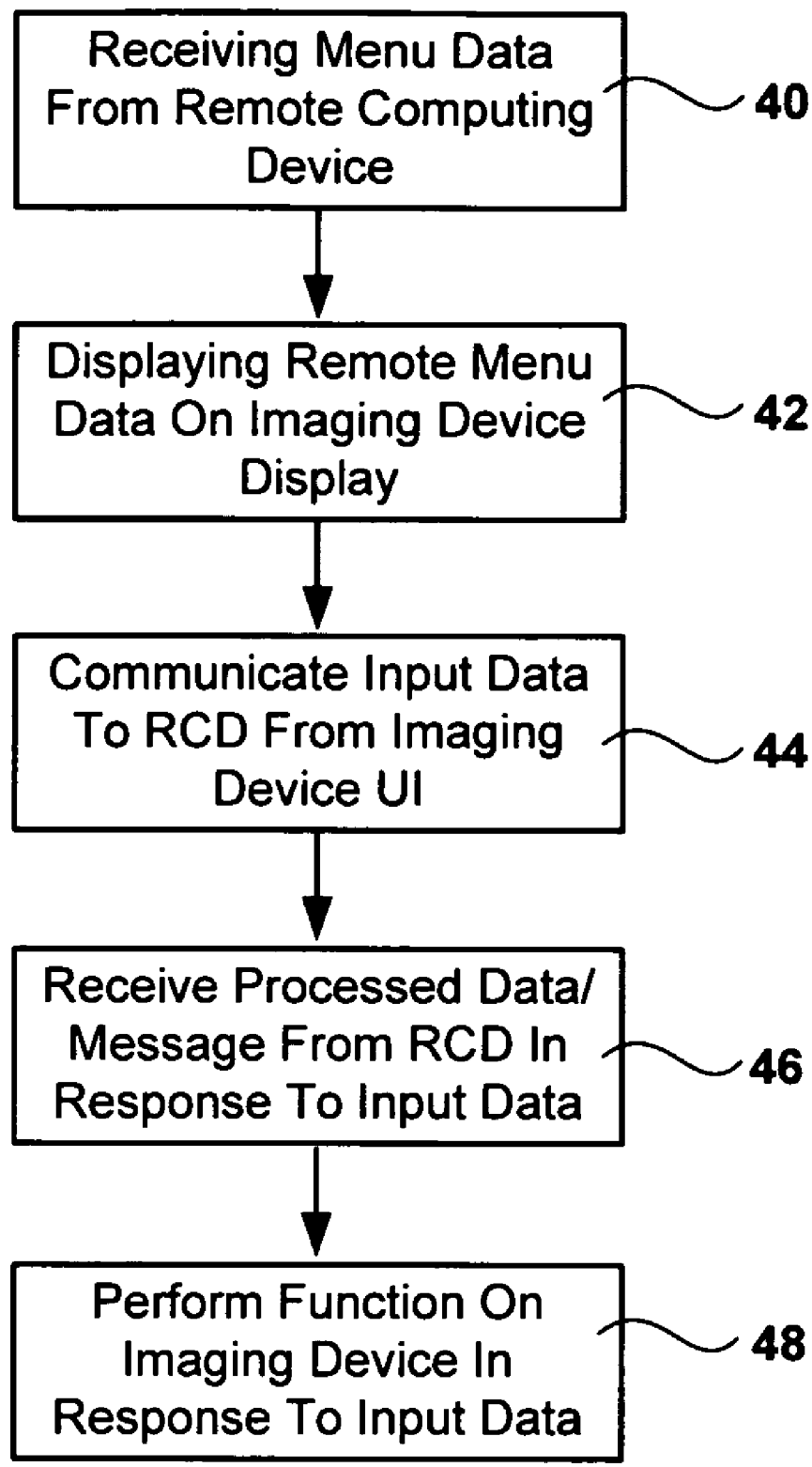
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
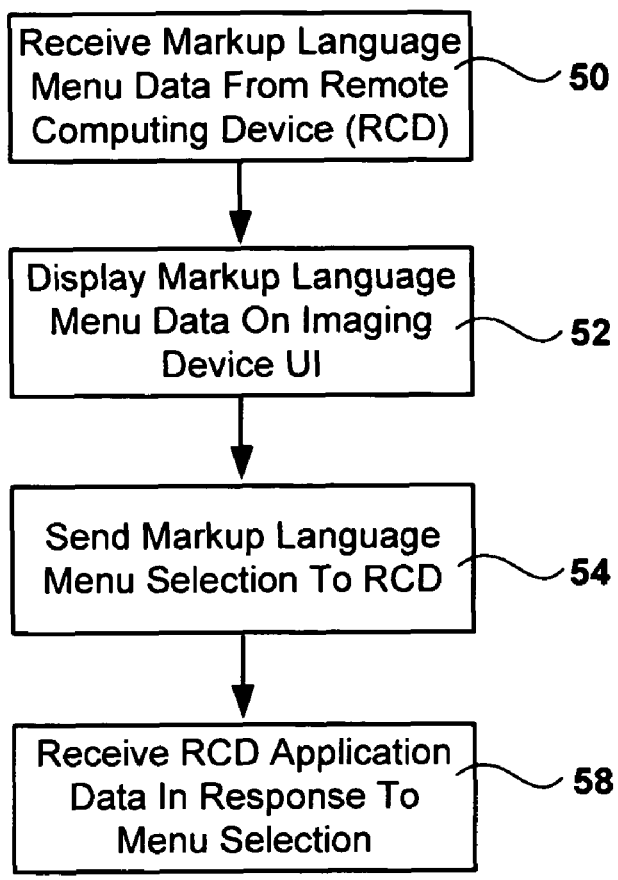
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received though its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
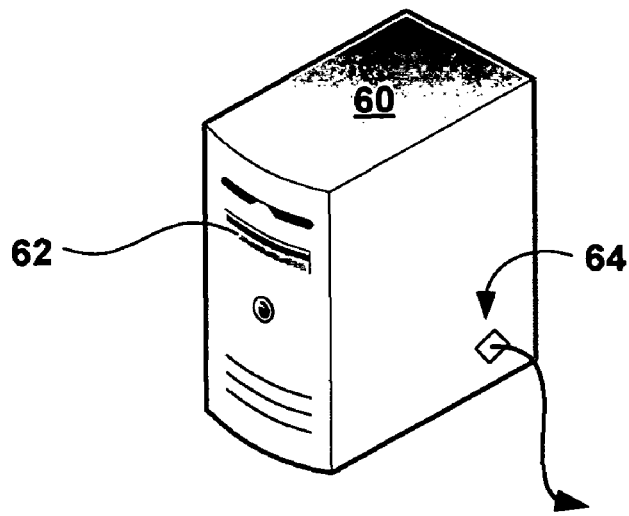
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
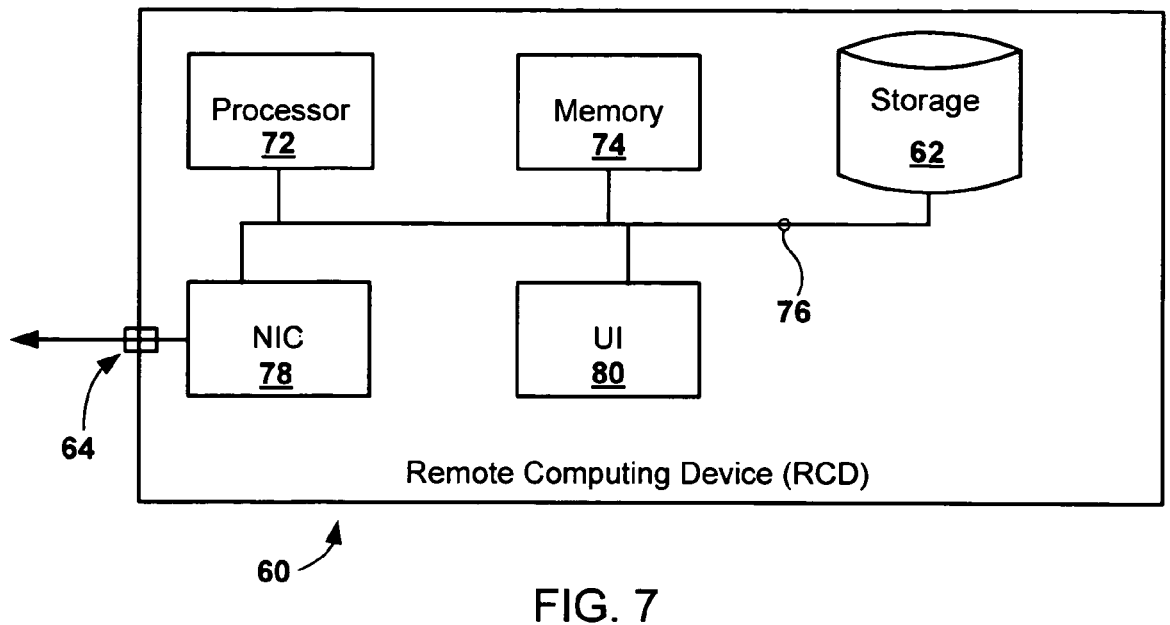
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
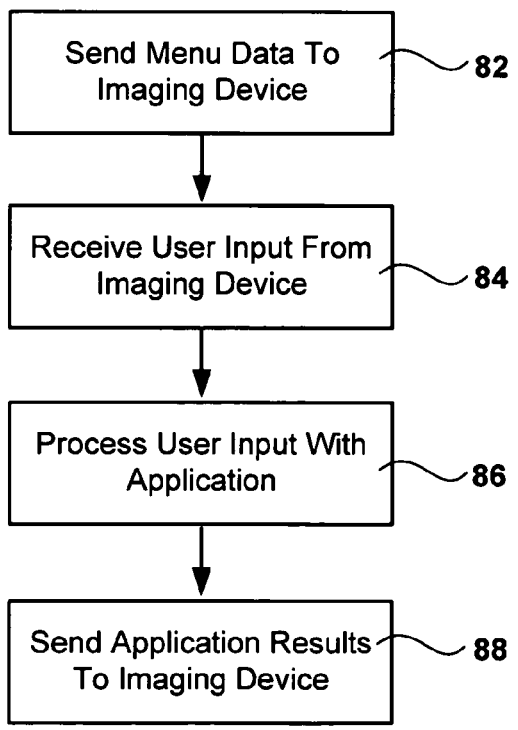
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
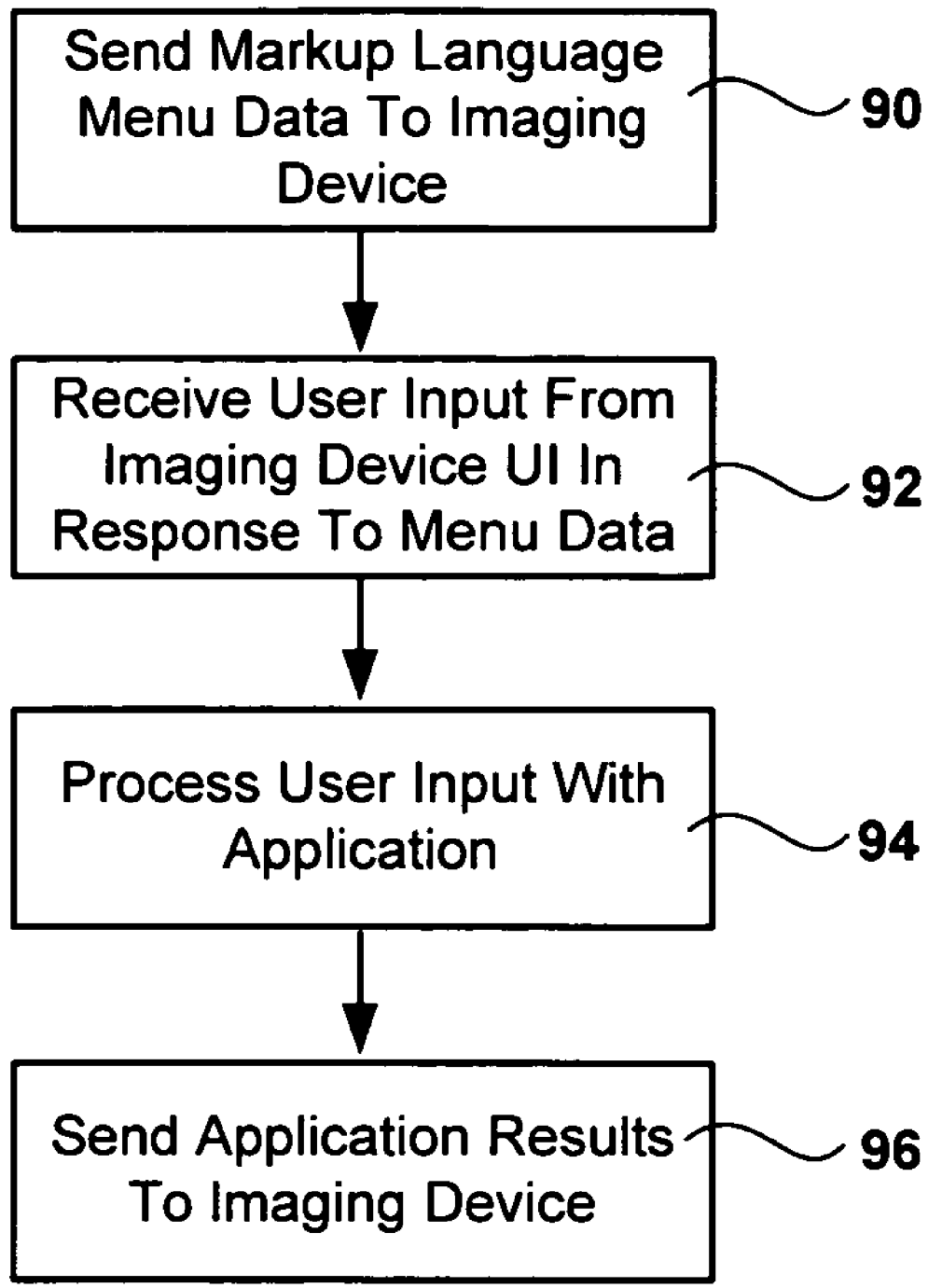
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
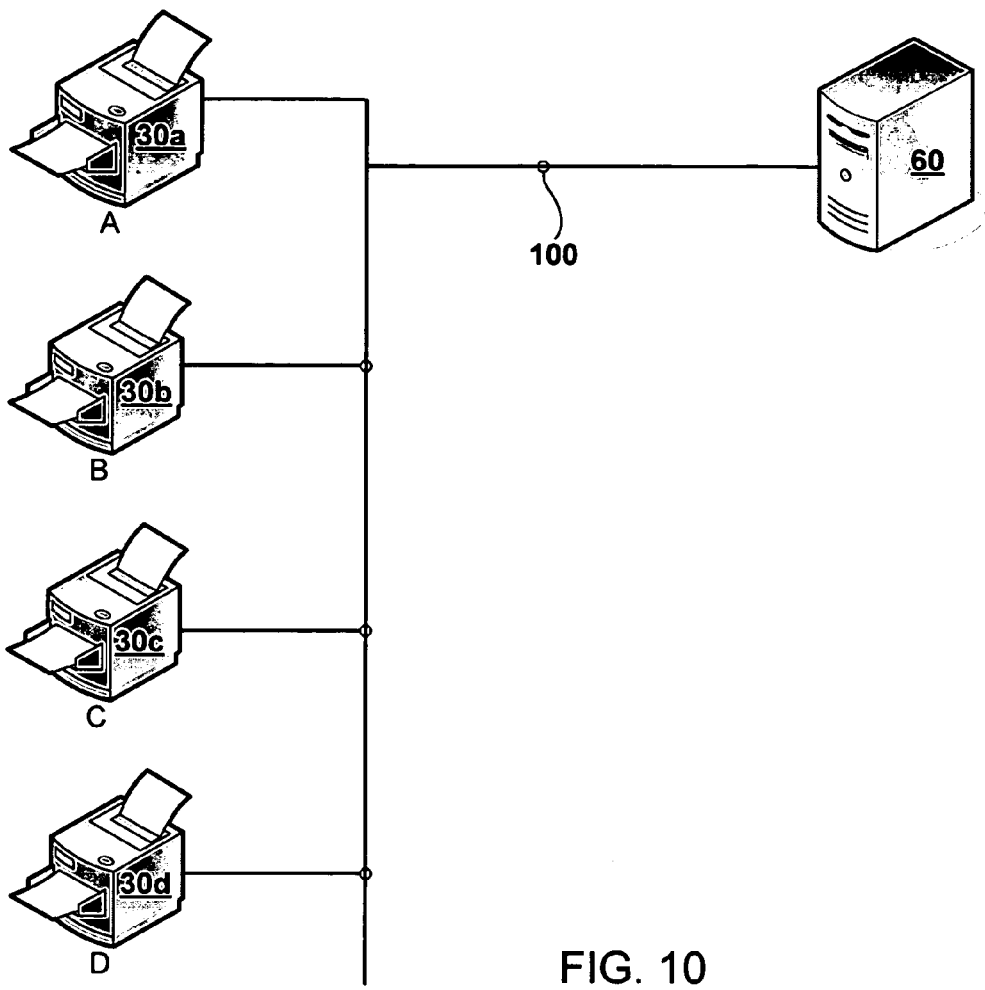
FIG. 10 is a diagram showing a system comprising multiple imaging devices in connection with a remote computing device.
Figure 11:
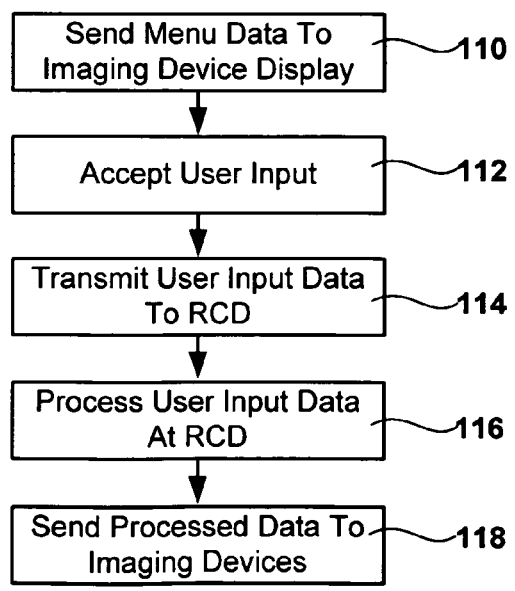
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30*a*-30*d*. In these embodiments, at least one of the imaging devices 30*a*-30*d* comprises a user interface 32 with a display 36 and user input panel 34 that is integral with the display (i.e., touch-screen) or a separate input unit. RCD 60 is connected to imaging devices 30*a*-30*d* by a communications link and network 100 to enable data transmission between RCD 60 and imaging devices 30*a*-30*d*.

In these embodiments, menu data is stored on RCD 60 and sent 110 to at least one of the imaging devices 30*a*-30*d* where the menu data is displayed on a user interface. Any of Imaging devices 30*a*-30*d* that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30*a*-30*d*.

In these embodiments, a single RCD 60 may be used to provide processing power, resources and functionality to a plurality of imaging devices 30*a*-30*d* without reproducing these resources in each imaging device. In some embodiments, data generated by input on one imaging device 30*a* may be directed to another imaging device 30*d* for processed data output or final processing.

Figure 12:
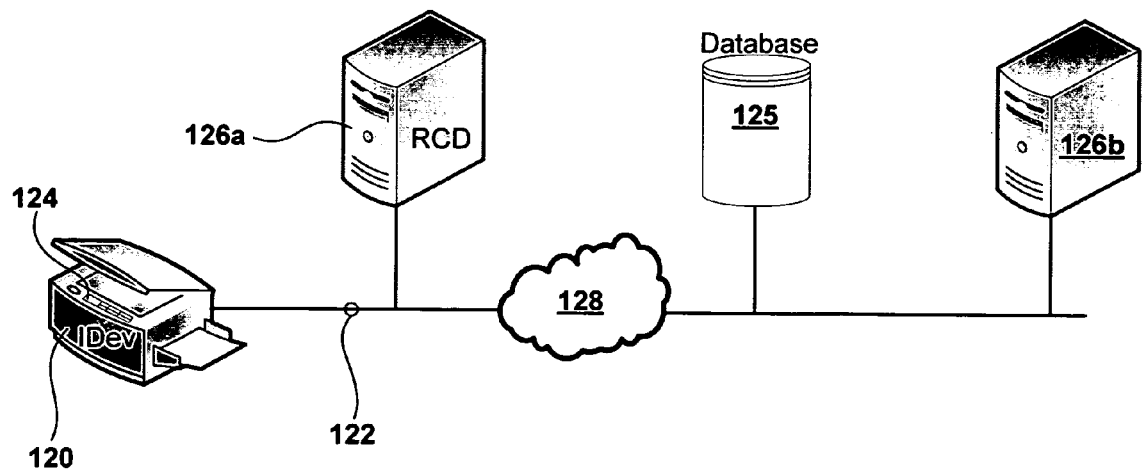
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 will typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126*a*, 126*b*, such as a server. The RCD 126*a*, 126*b* may be used to store documents, such as forms, and other data and make that data accessible from the imaging device 120. The RCD 126*a*, 126*b* may also execute applications that interact with or receive input from the imaging device 120 and its user interface 124. In some embodiments, a database 125 may be linked to the imaging device 120 and/or an RCD 126*a*, 126*b*. In some embodiments, an RCD 126*b* or database 125 may be connected to an IDev 120 over a wide area network such as the internet 128.

Display Element Localization Embodiments

Applications that are to be used in an international marketplace typically need to provide support for a plurality of languages, character sets, time formats, date formats, address formats, calendars, customs and other locale variables. These variables are generally constant within a limited geographical area and are, therefore, labeled as locale variables. However, these locale variables may differ from one office to the next according to the cultural or other preferences of application users. Even applications used in a single office building may need to provide multi-cultural support.

Applications may be coded with internal support for a plurality of languages and other locale variables. However, this technique does not allow for the addition of support for new variables after initial coding unless the application is rewritten. This technique also requires each application developer to independently develop support for each supported language or other variable.

Embodiments of the present invention comprise systems and methods for providing multi-cultural support through locale variables that are independent of the application. In these embodiments, an application is coded with local variables that are related to locale-specific resources, which are independent of the application. In some embodiments, the locale-specific resources may be updated and changed independently of the application. Multi-cultural support using locale variables may be referred to as localization.

Imaging device applications may interact with a user through the display of information on a user interface display device. This is typically a relatively small LCD or similar display. The display may be supported by a web browser and user input relative to what is being displayed may be received through a touch-screen device, a physical keyboard, buttons positioned in proximity to displayed content or many other input devices and methods.

In some embodiments of the present invention, an application may interact with a user through web content that may be sent to an IDev web browser for display on an IDev user interface display. The IDev may then receive input relative to the displayed content through a IDev user interface (UI) input device or by some other method.

In some embodiments, the web content sent to the IDev web browser may comprise locale-independent content that is non-locale-specific or independent of variables. This locale-independent content may be coded when the application is initially developed. However, to provide multi-cultural support or localization, locale variables may also be coded into display content. These locale variables may be related to a locale-specific resource, which may be used to fill the locale variable fields once a locale is identified. A locale-specific resource may be stored as a database, resource files, XML files or some other format. Data from a locale-specific resource may be merged with locale-independent content by performing substitutions when the page is integrated for display.

Some embodiments of the present invention may comprise a stand-alone imaging device (IDev) with internal processing capabilities. Other embodiments may comprise an imaging device (IDev) in communication with one or more remote computing devices (RCDs). The locale-specific resource and/or associated support applications may reside on the IDev or on one or more RCDs.

Figure 13:
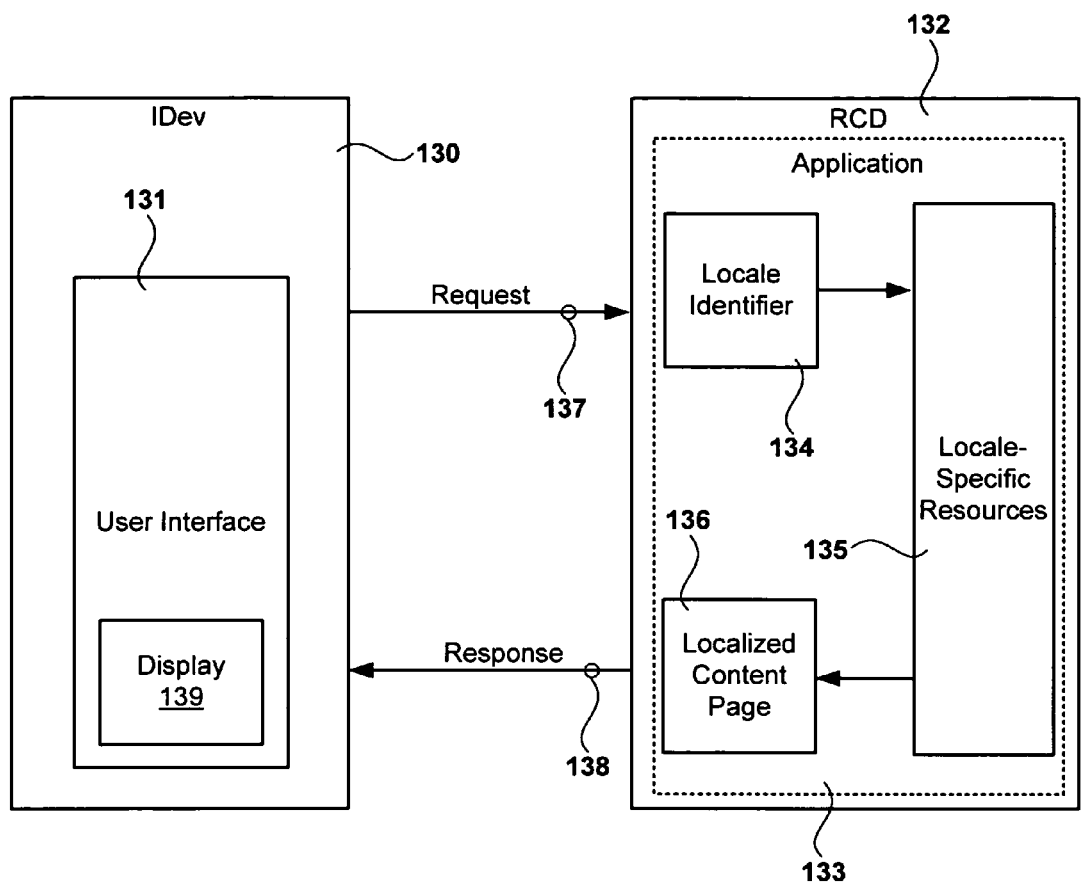
FIG. 13 is a diagram showing a system for imaging device display element localization.

Some embodiments of the present invention may be described in relation to FIG. 13. These embodiments may comprise an imaging device (IDev) 130, comprising a user interface 131 with a display 139. This UI display 139 may be supported by a web browser and processing capability (not shown). In these embodiments, the IDev may send a request 137, which is typically triggered by user input. This request may be sent to a remote computing device (RCD) 132 or to another application on the IDev. The UI 131 may also receive responses 138 from an RCD 132 or another application on the IDev. These embodiments may further comprise a localization application 133 running on an RCD 132 or on the IDev. A request 137 may comprise a locale identifier 134 that is capable of identifying an IDev locale or IDev user locale. The identified locale may then be used to pull locale-specific resources 135 that correspond to locale variables in a requested document. The locale-specific resources may then be merged or integrated with locale-independent content in a requested document to form a localized content page 136. This localized content page 136 may then be sent to the IDev UI as a response 138 to the request 137 sent by the IDev UI. The IDev may then display the response data on the UI display 139.

Figure 14:
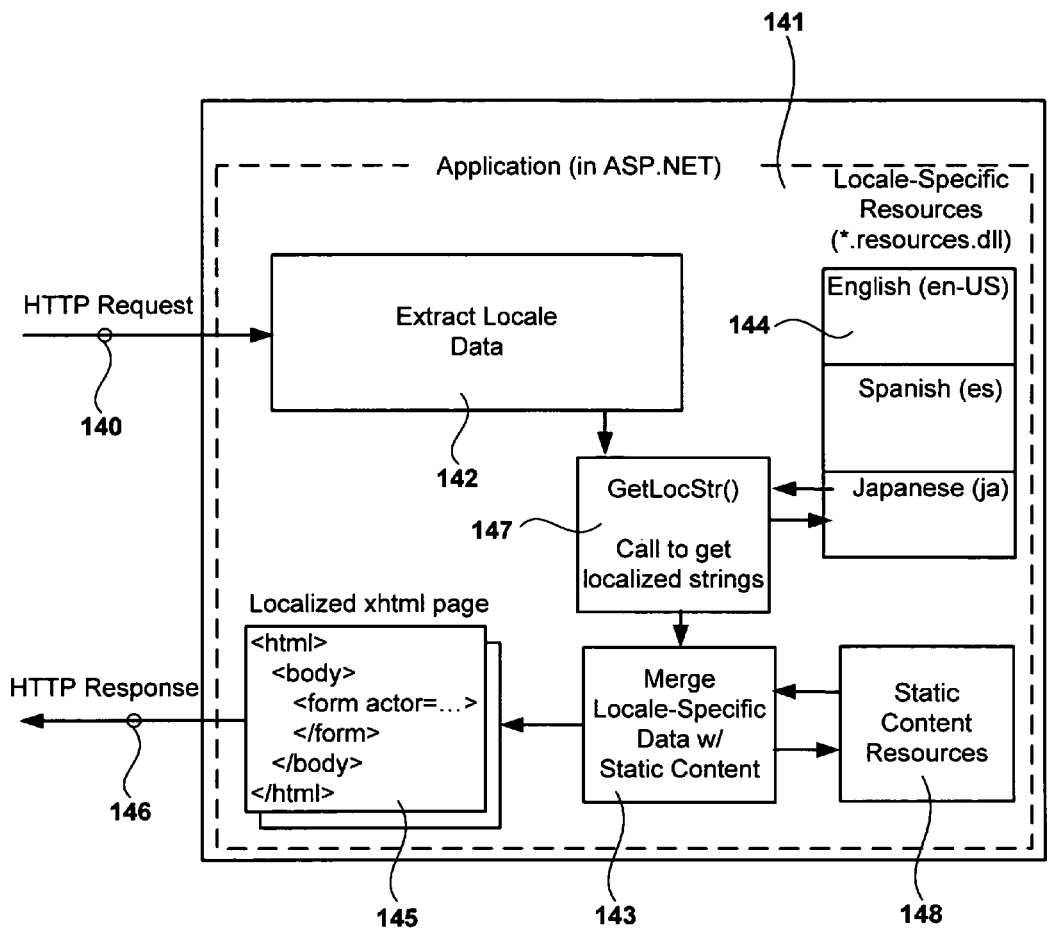
FIG. 14 is a diagram showing an application-side system for imaging device display element localization.

Some embodiments of the present invention may be described with reference to FIG. 14. In these embodiments, an application 141 may receive 140 an HTTP request comprising locale data. The application 141 may extract 142 the locale data and may then call 147 for localized strings and other locale-specific data from a locale-specific resource 144. The locale-specific resource 144 may be in the form of a dynamic link library (DLL). The application may also call for locale-independent content defined in the request 140. This locale-independent content may be stored in a locale-independent content resource 148. The application may then merge 143 the localized strings and the locale-independent content defined in the request 140 to form a localized page 145, which, in some embodiments, may be coded in a markup language, such as Extensible Hyper-Text Markup Language (XHTML). The application may then send the localized page to the IDev as a response 146 using HTTP or another protocol.

Figure 15:
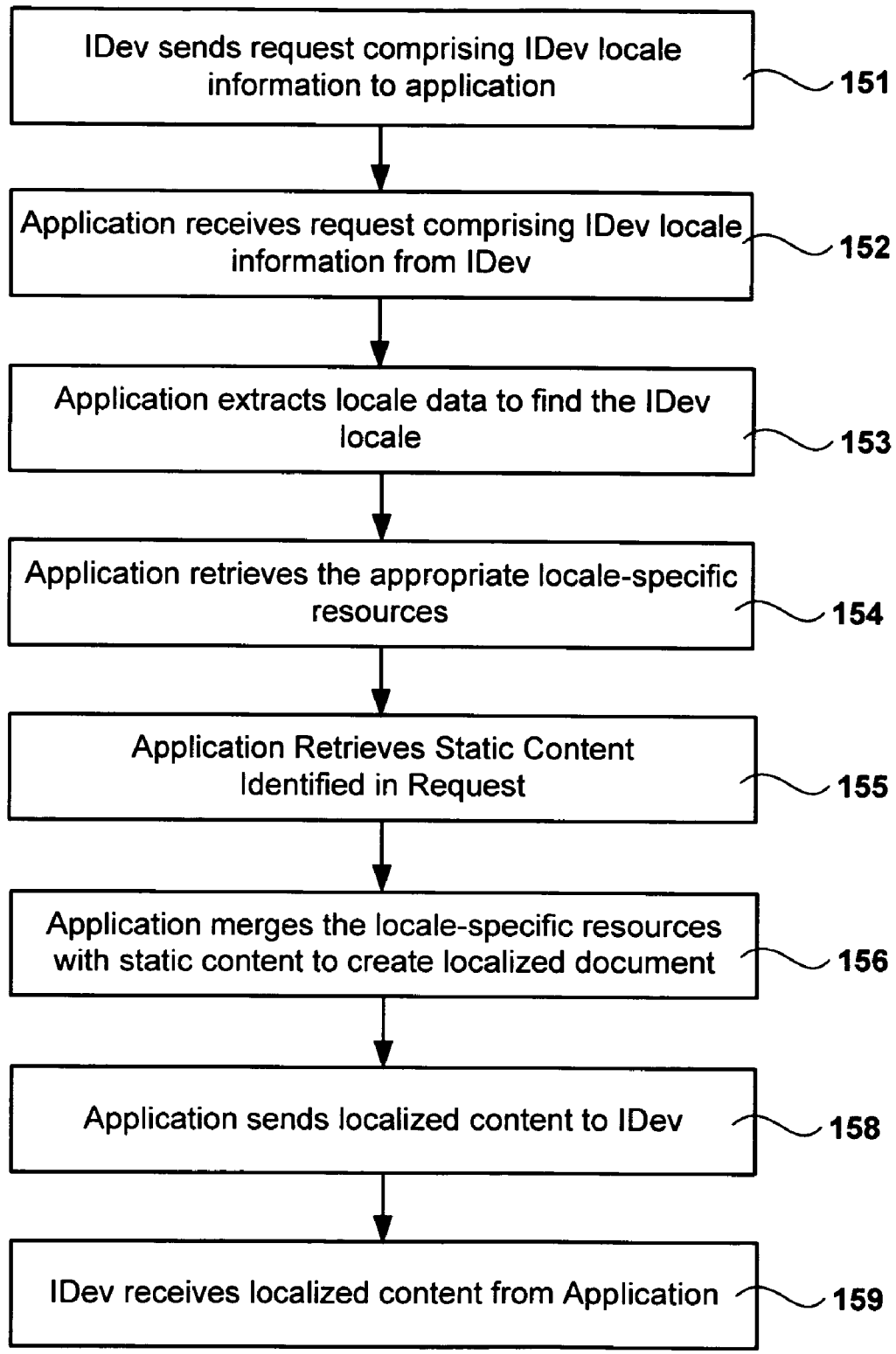
FIG. 15 is a chart showing steps of an embodiment comprising imaging device display element localization.

Some embodiments of the present invention, illustrated in FIG. 15, comprise sending 151 a request comprising a content identifier and a locale identifier. This request may be conveyed as a markup language page that is sent to an application. The application may receive 152 the request and may extract 153 the locale data to determine the IDev locale. The application may then retrieve 154 the appropriate locale-specific text strings and other resources that correspond to the locale identified in the request. The application may also retrieve 155 locale-independent content, such as a web page coded with locale-specific variables. This locale-specific data and the locale-independent content may then be merged 156 to form a localized document. The application may then send 158 the localized document to the requesting IDev, which may then receive 159 the localized document from the application and display it to a user at the IDev UI.

Figure 16:
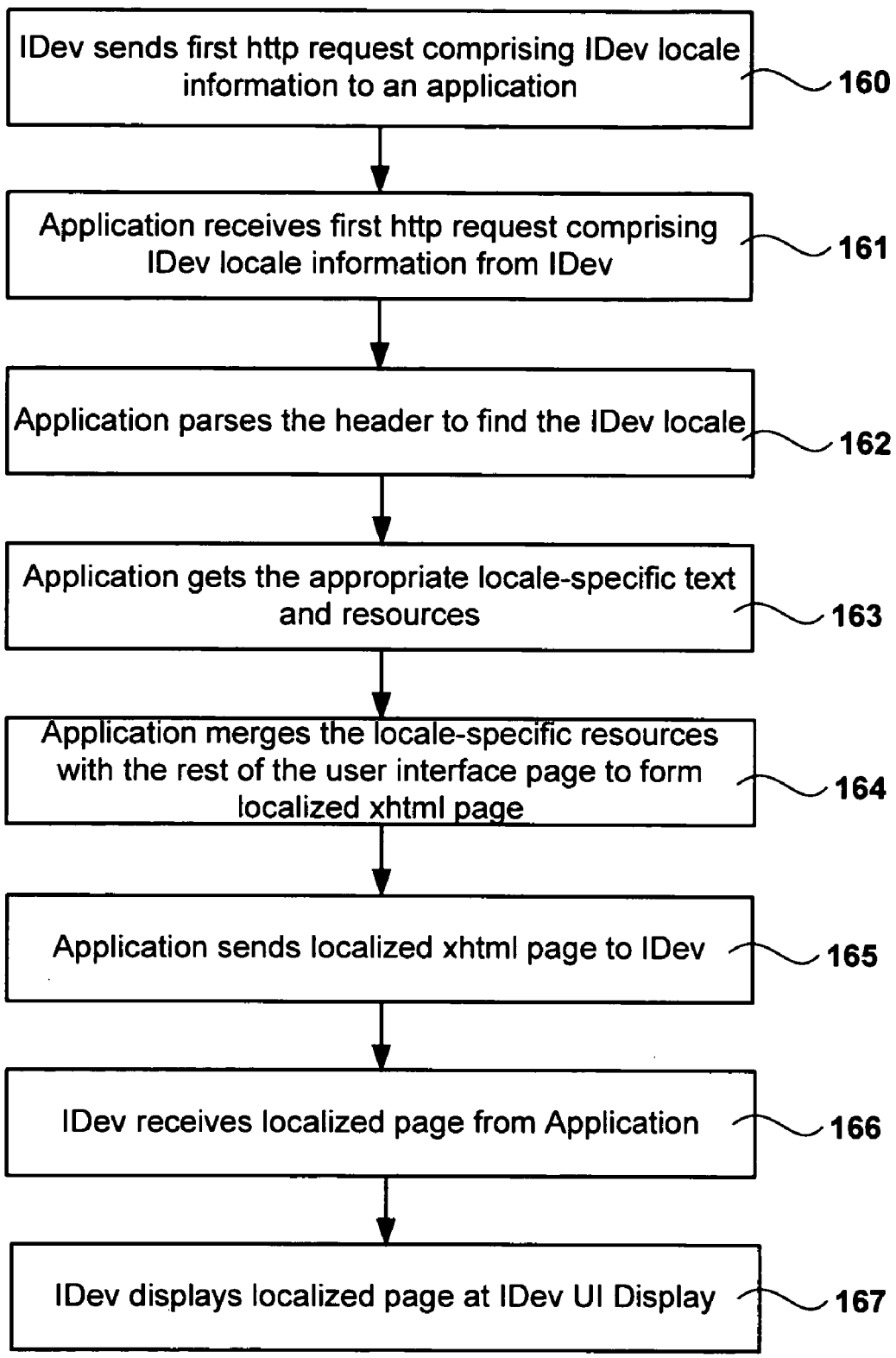
FIG. 16 is a chart showing steps of an embodiment comprising http requests and responses.

In an exemplary embodiment of the present invention, illustrated in FIG. 16, an IDev may send 160 an HTTP request comprising a user interface page with IDev locale data embedded in the page header. The request is sent 160 from an IDev to an application on a remote computing device (RCD) in this exemplary embodiment. The application may receive 161 the HTTP request and may parse 162 the header of the HTTP request to extract IDev locale data from which it may determine the IDev locale. The application may then get 163 the appropriate locale-specific text and resources for the identified locale. The application may also retrieve 164 web page locale-independent content identified in the request. This locale-independent content will typically be formatted with locale-specific variables such that the locale-specific resources may be integrated or merged into the locale-independent content. The application may merge 165 the locale-specific resources with the locale-independent content to form a localized page. The application may then send 166 the localized page back to the IDev, which may then receive 167 the localized page from the application. Once received at the IDev, the localized page may be displayed 168 on the IDev UI display.

Figure 17:
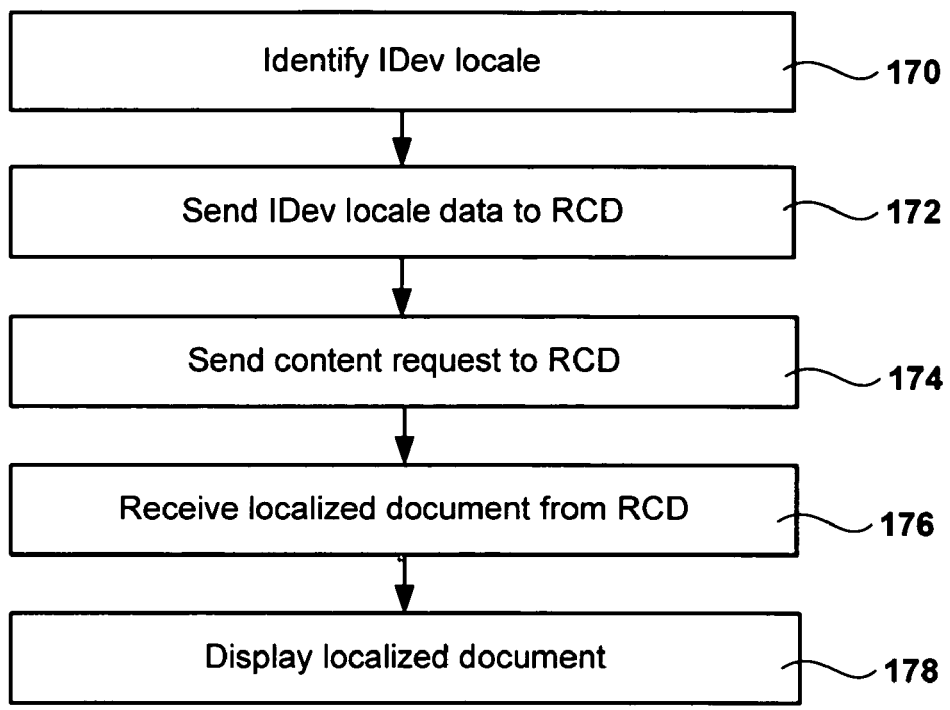
FIG. 17 is a chart showing steps of an embodiment comprising display of localized content on an imaging device (IDev)

Some imaging device embodiments of the present invention may be described with reference to FIG. 17. In these embodiments, an IDev may identify 170 its locale and send 172 the locale data to an RCD. The IDev may then send 174 a content request to the RCD. The IDev may then receive localized content back from the RCD and display 178 the localized content.

Figure 18:
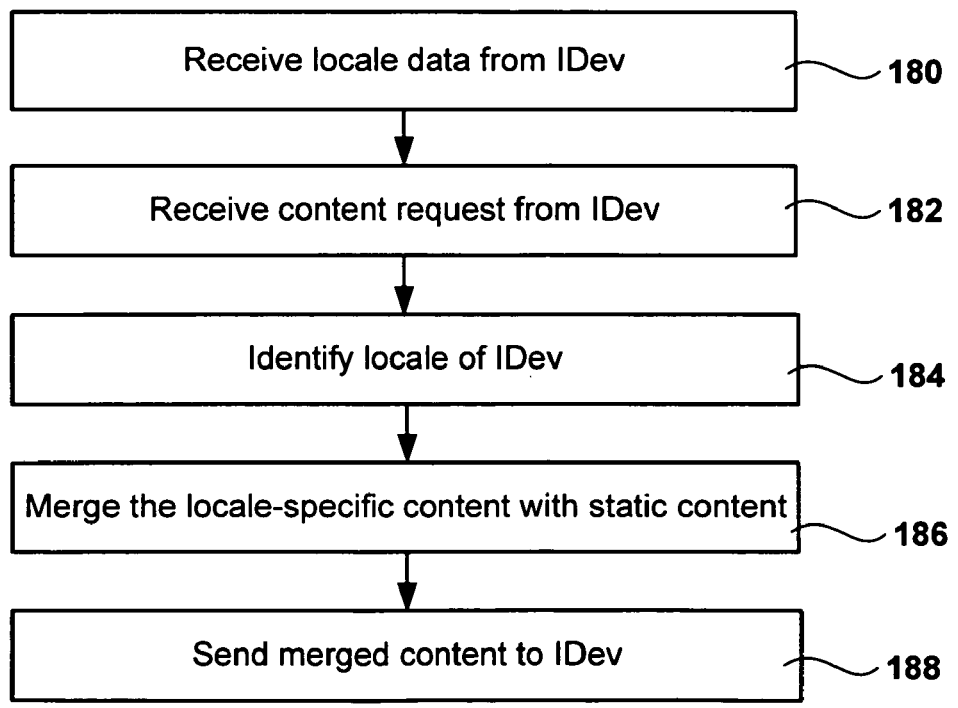
FIG. 18 is a chart showing steps of an embodiment comprising merging of locale-specific data with locale-independent content.

In further embodiments, illustrated in FIG. 18, an RCD may receive 180 locale data from an IDev. The RCD may also receive 181 a content request from the IDev. The RCD may identify 182 the locale of the IDev from the locale data. The RCD may then retrieve 183 locale-specific data corresponding to the locale identified in the locale data and may retrieve 184 locale-independent content corresponding to the content request. This locale-specific data and the locale-independent content may then be merged 185 to form a localized document. This localized document may then be sent 186 to the IDev.

Figure 19:
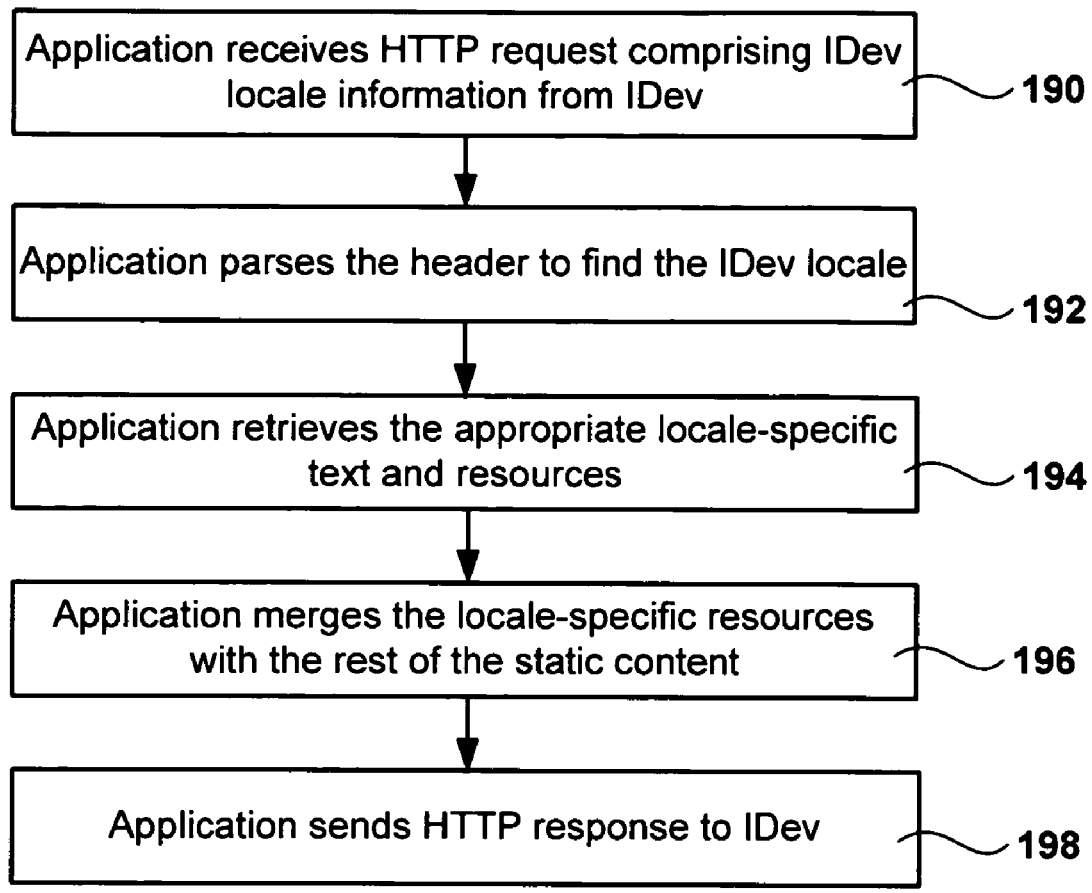
FIG. 19 is a chart showing steps of an embodiment comprising parsing the header of a content request to identify a locale.

In still other embodiments of the present invention, illustrated in FIG. 19, an application may receive 190 an HTTP request comprising IDev locale data from an IDev. The application may then parse 192 the header of the HTTP request to find the IDev locale. The application may then retrieve 194 the appropriate locale-specific text and resources that correspond to the IDev locale and any locale-independent content identified in the request. This locale-independent content and the locale-specific text and resources may then be merged 196 to form a localized page. The application may then send 198 a localized HTTP response comprising the localized page to the IDev.

Figure 20:
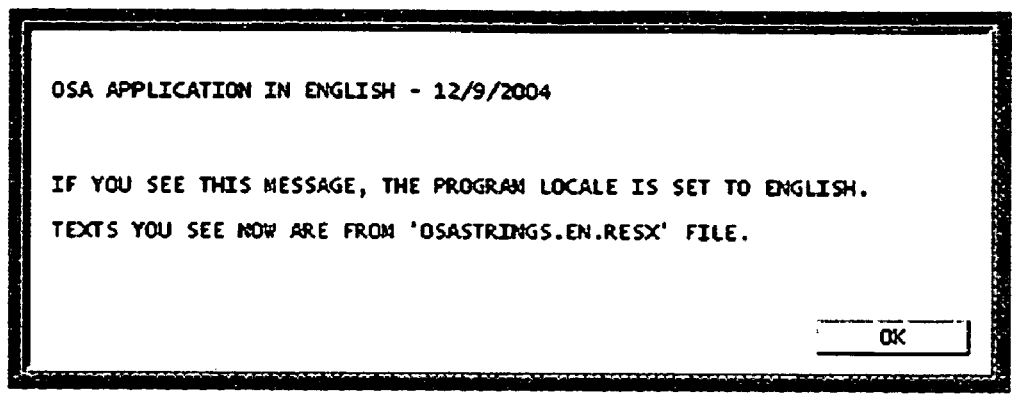
FIG. 20 is a diagram comprising exemplary embodiments of some localized imaging device (IDev) UI display pages.
Figure 20:
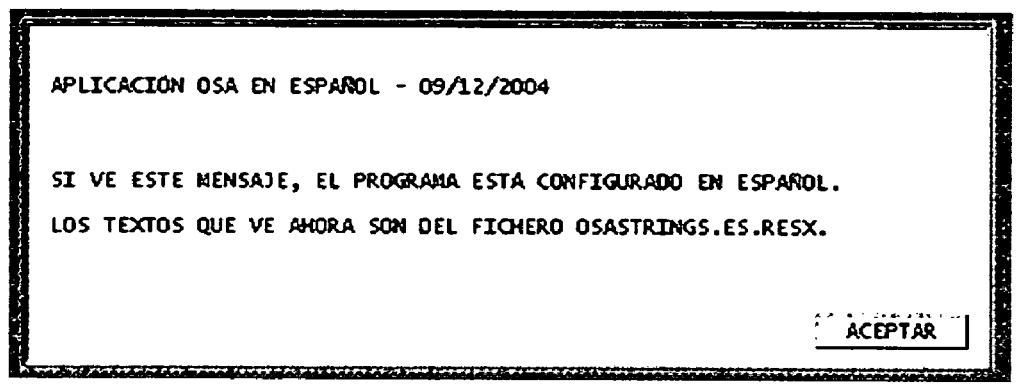
Figure 20:
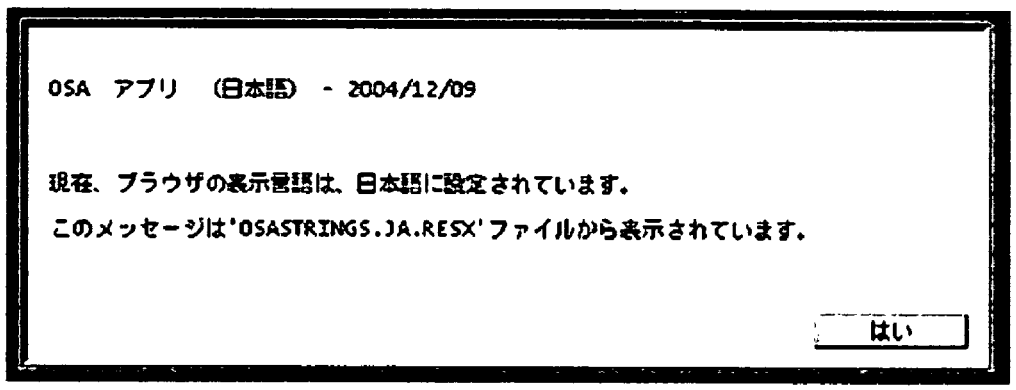
Figure 20:
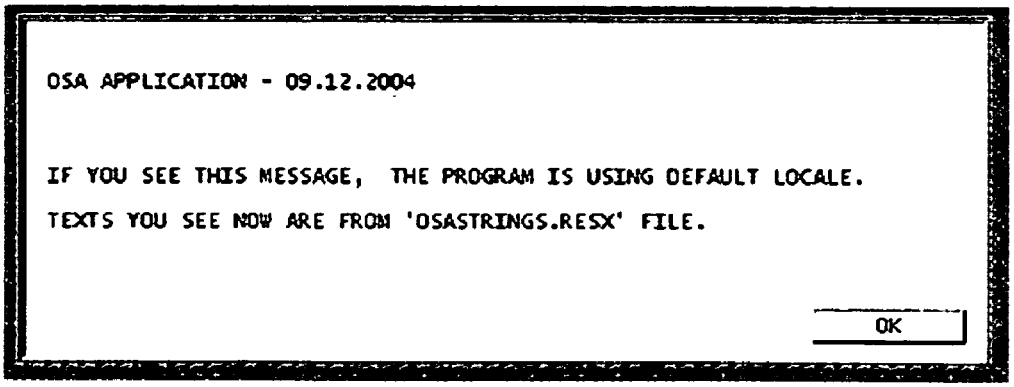

Some exemplary embodiments of the present invention may be described with reference to FIG. 20. When an application of some embodiments of the present invention merges locale-specific data with locale-independent content the result of this process will differ based on the specific locale identified in the request.

In an exemplary embodiment, the localized page resulting from the merging process, with the locale identified as an English-speaking country, is shown at 200.

In this same exemplary embodiment with the content identified in the request being constant and the locale being changed to a Spanish-speaking country, the resulting localized page is shown at 202.

In this same exemplary embodiment with the content identified in the request being constant and the locale being changed to a Japanese-speaking country, the resulting localized page is shown at 204.

In this same exemplary embodiment with the content identified in the request being constant and the locale being changed to a default value, the resulting localized page is shown at 206.

In some embodiments of the present invention, a HTTP request may be sent from an imaging device (IDev) to an application. The HTTP request may comprise a HTTP header, comprising an Accept-Language and Accept-Charset entry. In some exemplary embodiments of the present invention, the Accept-Language and Accept-Charset entries may vary depending on the locale of the IDev. The settings may comprise the following:

| HTTP HEADER (sent by IDev) | | |
| --- | --- | --- |
| Locale | Accept-Language | Accept-Charset |
| Japanese | ja | Shift_JIS |
| English (USA) | en-us | windows-1252 |
| English (UK) | en | windows-1252 |
| Spanish | es | windows-1252 |
| French | fr | windows-1252 |
| German | de | windows-1252 |
| Italian | it | windows-1252 |
| Dutch | nl | windows-1252 |
| Swedish | sv | windows-1252 |
| Norwegian | no | windows-1252 |
| Finnish | fi | windows-1252 |
| Danish | da | windows-1252 |
| Portuguese | pt | windows-1252 |
| Hungarian | hu | windows-1250 |
| Czech | cs | windows-1250 |
| Polish | pl | windows-1250 |
| Russian | ru | ISO-8859-5 |
| Greek | el | ISO-8859-7 |
| Turkish | tr | ISO-8859-9 |
| Chinese (simplified) | zh-CN | GB2312, and |
| Chinese (traditional) | zh-TW | Big5. |

In further embodiments of the present invention, an application may read the Accept-Language and Accept-Charset headers and, depending on the setting of the Accept-Language header sent, the application may retrieve the appropriate resource strings for text display. The application may also adapt to an appropriate date display format and other locale specific items. The application may then send the HTTP Response to the IDev with the appropriate XHTML page with localized text string to be filled in.

In further embodiments of the present invention, an application may localize the content by isolating the text strings that must be localized into resource files (*.resx), compiling these resource files into a *.resources.dll file for each locale and setting up Culture and UI Culture settings that are appropriate for the current locale. These settings may affect the currency, date and time display format, and other culture-dependent representations and displays. In some embodiments, an application may set the calendar to an alternate calendar (the default calendar is the Gregorian calendar, but some parts of the world uses alternate calendars).

In some embodiments of the present invention, a base code behind a page may perform the localization processes common to all pages. A delivered code behind the page may call a method (i.e., GetLocStr( )) to retrieve the appropriate text strings for the IDev's locale automatically and may merge these strings with the rest of the locale-independent content designated to generate a localized XHTML page. The application may then send the localized page to the IDev.

In some exemplary embodiments, the resource file for each locale may be defined in a *.xx.resx file or ASP resource file, where xx identifies a specific locale (for example, en, es, de, ja, and so on) as name-value pairs. In some exemplary embodiments, the resource file may be compiled into a resource DLL file (projectname.resources.dll) in the xx directory under the bin directory for run-time loading of the resources.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for imaging device display element localization, said method comprising:
registering a remote computing device (RCD) application with an imaging device (IDev) wherein said RCD application is accessed when a trigger input is received at an IDev user interface (UI);
receiving a notification at said RCD application, said notification indicating that said trigger input was received at said IDev UI;
sending menu data to said IDev in response to said receiving a notification, wherein said menu data is in the form of an XML message and wherein said menu content data comprises at least one prompt to solicit user input at said IDev UI;
receiving locale data from said IDev UI, wherein said locale data is embedded in a header of an HTTP request and said locale data defines the geographical locale of a user;
receiving a content request from said IDev, wherein said content request is a user interface page in said HTTP request and said content request identifies locale-independent content;
identifying a locale from said locale data;
retrieving locale-specific data related to said locale using a dynamic link library (DLL), wherein said locale-specific data consists of a language, a time format, a date format, an address format, a calendar format and a currency type;
retrieving static content identified in said content request;
merging said locale-specific data with said static content to form a localized document; and
sending said localized document to said IDev.

2. A method as described in claim 1 wherein said receiving locale data is accomplished by receiving a markup language document.

3. A method as described in claim 1 wherein said receiving a content request is accomplished by receiving a markup language document.

4. A method as described in claim 1 wherein said receiving locale data and said receiving a content request are accomplished by receiving a single markup language document wherein said locale data is part of a header in said document.

5. A method as described in claim 1 wherein said identifying a locale comprises parsing said markup language document.

6. A method as described in claim 1 wherein said localized document is a markup language document comprising locale-specific variables that are filled with said locale-specific data.

7. A method as described in claim 1 wherein said retrieving is at least partially accomplished with a Web Service method.

8. A method as described in claim 1 wherein said static content comprises a markup language page comprising locale-specific variables.

9. A method as described in claim 1 wherein said localized document is a localized XHTML page.

10. A method for imaging device display element localization, said method comprising:
- registering a remote computing device (RCD) application with an imaging device (IDev) wherein said RCD application is accessed when a trigger input is received at an IDev user interface (UI);
- receiving a notification at said RCD application, said notification indicating that said trigger input was received at said IDev UI;
- sending menu data to said IDev in response to said receiving a notification, wherein said menu data is in the form of an XML message and wherein said menu content data comprises at least one prompt to solicit user input at said IDev UI;
- receiving an HTTP request from said IDev UI, said HTTP request comprising header and a user interface page, wherein locale data is embedded in said HTTP request header and wherein said user interface page comprises a content request;
- parsing at least a portion of said HTTP request header to identify a locale communicated through said locale data;
- identifying locale-specific variables in said content request;
- accessing a dynamic link library (DLL) to retrieve locale-specific data related to said locale-specific variables, wherein said locale-specific data consists of a language, a time format, a date format, an address format, a calendar format and a currency type;
- retrieving static content identified in said content request;
- merging said locale-specific data with said static content to form a localized document; and
- sending said localized document to said IDev.

11. An apparatus for imaging device display element localization, said apparatus comprising:
- a register for registering a remote computing device (RCD) application with an imaging device (IDev) wherein said RCD application is accessed when a trigger input is received at an IDev user interface (UI);
- a notification receiver for receiving a notification at said RCD, said notification indicating that said trigger input was received at said IDev UI;
- a menu sender for sending menu data to an imaging device (IDev), in response to said receiving a notification, wherein said menu data is in the form of an XML message and wherein said menu content data comprises at least one prompt to solicit user input at said IDev UI;
- a locale receiver, in said RCD, said locale receiver for receiving imaging device (IDev) locale data from said IDev, wherein said local data is embedded in a header of an HTTP request and said locale data defines the geographical locale of a user;
- a request receiver for receiving a content request from said IDev, wherein said content request is a user interface page in said HTTP request;
- an extractor for extracting a locale from said IDev locale data;
- a locale-specific data interface for requesting and receiving locale-specific data related to said locale from a locale-specific resource comprising a dynamic link library (DLL), wherein said locale-specific data consists of a language, a time format, a date format, an address format, a calendar format and a currency type;
- a static content interface for requesting and receiving static content from a static content resource;
- a merger for merging said locale-specific data with said static content to produce a localized document;
- a sender for sending said localized document to said IDev; and
- a communication network linking said RCD and said IDev.

12. An apparatus as described in claim 11 wherein said locale data receiver and said request receiver are a single receiver.

13. An apparatus as described in claim 11 wherein said locale data receiver is configured to receive a markup language page and parse said page to identify said locale.

14. An apparatus as described in claim 11 wherein said request receiver is configured to receive a markup language page and parse said page to identify said content.

15. An apparatus as described in claim 11 wherein said static content resource comprises a dynamic link library.

16. An apparatus as described in claim 11 wherein said static content comprises a markup language page comprising locale-specific variables.

17. An apparatus as described in claim 11 wherein said localized document is a localized XHTML page.

* * * * *